(12) United States Patent
Watanabe

(10) Patent No.: US 12,155,912 B2
(45) Date of Patent: *Nov. 26, 2024

(54) SYSTEM, METHOD, AND PROGRAM FOR DISTRIBUTING VIDEO

(71) Applicant: GREE, Inc., Tokyo (JP)

(72) Inventor: Masashi Watanabe, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,195

(22) Filed: Jun. 27, 2023

(65) Prior Publication Data
US 2023/0345084 A1    Oct. 26, 2023

Related U.S. Application Data

(63) Continuation of application No. 17/295,396, filed as application No. PCT/JP2019/044998 on Nov. 18, 2019, now Pat. No. 11,736,779.

(30) Foreign Application Priority Data

| Nov. 20, 2018 | (JP) | ................................. 2018-217228 |
| Mar. 18, 2019 | (JP) | ................................. 2019-049476 |

(Continued)

(51) Int. Cl.
*H04N 7/173*    (2011.01)
*G06F 3/0482*    (2013.01)
(Continued)

(52) U.S. Cl.
CPC ....... *H04N 21/8146* (2013.01); *G06F 3/0482* (2013.01); *G06T 13/40* (2013.01);
(Continued)

(58) Field of Classification Search
CPC ............ H04N 21/8146; H04N 21/433; H04N 21/472; H04N 21/2187; H04N 21/4316; H04N 21/816; G06T 13/80; G06F 3/0482
See application file for complete search history.

(56) References Cited

U.S. PATENT DOCUMENTS

2009/0319601 A1 * 12/2009 Zvonaric ................ G06Q 30/02
                                                                709/203
2010/0045697 A1    2/2010 Reville et al.
(Continued)

FOREIGN PATENT DOCUMENTS

| CN | 105765620 A | 7/2016 |
| CN | 106210855 A | 12/2016 |

(Continued)

OTHER PUBLICATIONS

Translation version of WO 2018142494 A1, 2018 (Year: 2018).*
(Continued)

*Primary Examiner* — Gigi L Dubasky
(74) *Attorney, Agent, or Firm* — Pillsbury Winthrop Shaw Pittman, LLP

(57) ABSTRACT

A video distribution system distributes a video including animation of a character object generated based on a motion of an actor to client devices used by a plurality of viewing users. The video distribution system includes: one or more computer processors; a storage that stores objects associated with each of the plurality of viewing users; and a display device seeable by the actor. The one or more computer processors execute computer-readable instructions to: receive a display request for any of the objects from a first viewing user among the plurality of viewing users; and display object information on the display device, the object information including information on the object correspond- (Continued)

ing to the display request in association with identification information of the first viewing user.

10 Claims, 16 Drawing Sheets

(30) Foreign Application Priority Data

Mar. 18, 2019 (JP) .................................. 2019-049477
May 7, 2019 (JP) .................................. 2019-087383

(51) Int. Cl.
| | |
|---|---|
| *G06T 13/40* | (2011.01) |
| *G06T 13/80* | (2011.01) |
| *H04N 21/239* | (2011.01) |
| *H04N 21/433* | (2011.01) |
| *H04N 21/472* | (2011.01) |
| *H04N 21/81* | (2011.01) |

(52) U.S. Cl.
CPC ......... *G06T 13/80* (2013.01); *H04N 21/2393* (2013.01); *H04N 21/433* (2013.01); *H04N 21/472* (2013.01); *G06T 2200/24* (2013.01)

(56) References Cited

U.S. PATENT DOCUMENTS

| | | | | |
|---|---|---|---|---|
| 2011/0288912 | A1* | 11/2011 | McCrea | ............. G06Q 30/0217 705/14.2 |
| 2013/0215116 | A1 | 8/2013 | Siddique et al. | |
| 2014/0035913 | A1 | 2/2014 | Higgins et al. | |
| 2016/0286275 | A1 | 9/2016 | Maeda et al. | |
| 2019/0102929 | A1* | 4/2019 | Davis | ...................... G06T 15/00 |

FOREIGN PATENT DOCUMENTS

| | | | |
|---|---|---|---|
| CN | 106412614 A | 2/2017 | |
| JP | 2012-120098 A | 6/2012 | |
| WO | WO-2018142494 A1 * | 8/2018 | ......... H04N 21/2187 |

OTHER PUBLICATIONS

Final Office Action dated Sep. 7, 2023, issued in corresponding U.S. Appl. No. 17/395,241 (36 pgs.).
First Office Action dated Jan. 26, 2024, issued in corresponding Chinese Patent Application No. 202210597462.0 with English translation (26 pgs.).
Decision to Refuse European Patent Application dated Feb. 9, 2024, issued in corresponding European Patent Application No. 19173227.0 (17 pgs.).
Minutes of the Hearing before Examining Division dated Feb. 8, 2024, issued in corresponding European Patent Application No. 19173227.0 (4 pgs.).
Non-Final Office Action dated Jan. 31, 2024, issued in corresponding U.S. Appl. No. 17/395,241 (29 pgs.).
First Office Action dated Dec. 15, 2023, issued in corresponding Chinese Patent Application No. 202210597360.9 with English translation (20 pgs.).
Notice of Reasons for Refusal dated Dec. 19, 2023, issued in corresponding Japanese Patent Application No. 2022-206665 with English translation (7 pgs.).
Non-final Office Action dated Jul. 19, 2024, issued in corresponding U.S. Appl. No. 18/493,392 (12 pgs.).

* cited by examiner

| Content | User ID | Group | Room Visit Status | Ranking | Payment Status |
|---|---|---|---|---|---|
| R001 | 0001 | 1 | Visiting | 1 | Paid |
|  | 0002 | 2 | Left | 100 | Not Paid |
|  | 0010 | 1 | Left | 5 | Paid |
|  | 0020 | 2 | Visiting | 30 | Paid |
| ⋮ |  | ⋮ | ⋮ | ⋮ | ⋮ |

~23C

| User ID | Content | Possessed Object (1) | Possessed Object (2) | ... |
|---|---|---|---|---|
| 0001 | R001 | OB001 | OB002 | ⋮ |
|  | ⋮ | ⋮ | ⋮ | ⋮ |

~23D

| Content | User ID | Gift Object | Type | Sending Date-Time | Selection Status |
|---|---|---|---|---|---|
| R001 | 0001 | OB001 | Decorative | **** | Unselected |
| | 0005 | OB003 | Effect | **** | — |
| | 0012 | OB010 | Normal | **** | — |

Fig. 7

| Content | User ID | Message Text | Posting Date-Time |
|---|---|---|---|
| R001 | 0002 | Hello. | **** |
| | 0003 | I followed you. | **** |
| | 0010 | Many Thanks. | **** |

SYSTEM, METHOD, AND PROGRAM FOR DISTRIBUTING VIDEO

CROSS-REFERENCE TO RELATED APPLICATION

This application is a Continuation application of U.S. Ser. No. 17/295,396, filed on May 19, 2021, which is a national stage entry of PCT/JP2019/044998, filed on Nov. 18, 2019, which claims priority to and benefit of Japanese Patent Application No. 2018-217228, filed on Nov. 20, 2018, Japanese Patent Application No. 2019-049476, filed on Mar. 18, 2019. Japanese Patent Application No. 2019-049477, filed on Mar. 18, 2019 and Japanese Patent Application No. 2019-087383, filed on May 7, 2019. The entire contents of each of the above are incorporated herein by reference.

TECHNICAL FIELD

The present disclosure relates to a system, method, and program for distributing a video.

BACKGROUND

Some video distribution systems have been known to generate animation of a character object based on an actor's motions and distribute a video including the generated animation (see, for example, Patent Literature 1).

It is proposed that such video distribution systems distribute a video to multiple viewing users and the video contain a desired object displayed in accordance with operation by the viewing users. For example, the viewing users are capable of having a gift object they presented to the character object be displayed in the video.

SUMMARY

To increase the number of viewing users who view the distributed video and the number of times the distributed video is viewed, the character object should have originality, and in addition, it is important to increase the chances for communication between the actor and the viewing users through the character object.

However, the actor has to provide motions to the character object, utter a voice as necessary, and moreover, react to a gift object. To increase the chances for communication with the viewing users, the actor has to pay additional attention. Therefore, it is actually difficult for the actor to increase the chances for communication with the viewing users.

One object of the present disclosure is to provide a mechanism for increasing the chances for communication with the viewing users.

According to one aspect of the present disclosure, provided is a video distribution system for distributing a video including animation of a character object generated based on a motion of an actor to client devices used by a plurality of viewing users. The video distribution system comprises: one or more computer processors; a storage that stores objects associated with each of the plurality of viewing users; and a display device seeable by the actor. The one or more computer processors execute computer-readable instructions to: receive a display request for any of the objects from a first viewing user among the plurality of viewing users; and display object information on the display device, the object information including information on the object corresponding to the display request in association with identification information of the first viewing user.

According to another aspect, provided is a video distribution method performed by one or more computer processors executing computer-readable instructions to distribute a video including animation of a character object generated based on a motion of an actor to client devices used by a plurality of viewing users. The video distribution method comprises: storing, on a storage, objects associated with each of the plurality of viewing users; and receive a display request for any of the objects from a first viewing user among the plurality of viewing users; and display object information on a display device disposed at a position seeable by the actor, the object information including information on the object corresponding to the display request in association with identification information of the first viewing user.

According to still another aspect, provided is a video distribution program for distributing a video including animation of a character object generated based on a motion of an actor to client devices used by a plurality of viewing users. The video distribution program causes one or more computer processors to: storing, on a storage, objects associated with each of the plurality of viewing users; and receive a display request for any of the object from a first viewing user among the plurality of viewing users; and display object information on a display device disposed at a position seeable by the actor, the object information including information on the object corresponding to the display request in association with identification information of the first viewing user.

BRIEF DESCRIPTION OF THE DRAWINGS

FIG. 7 illustrates an example of a candidate list.

FIG. 8 illustrates examples of post messages.

FIG. 14 illustrates an example of a view displayed on a display seen by an actor.

DESCRIPTION OF THE EMBODIMENTS

Figure 1:
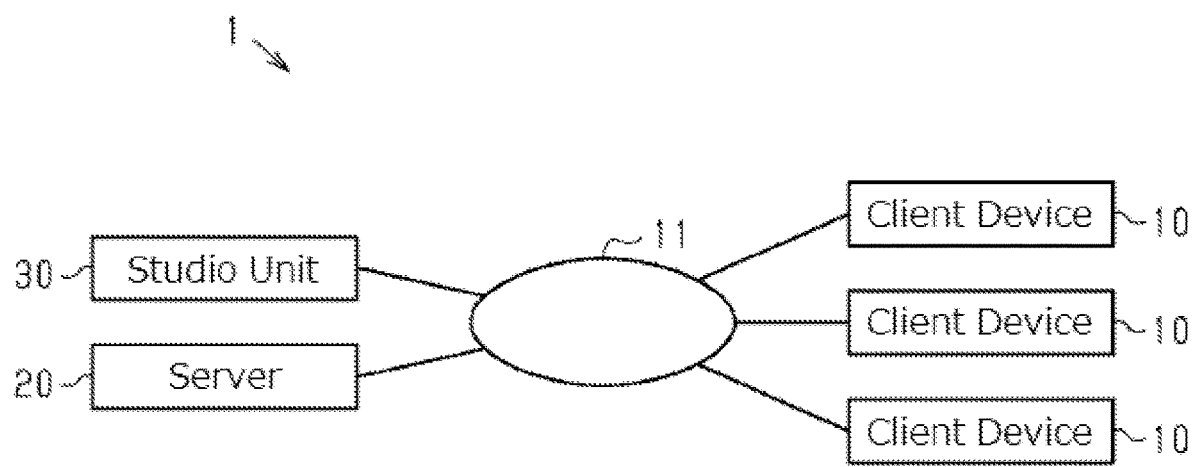
FIG. 1 is a schematic diagram of a video distribution system according to one embodiment.

With reference to the appended drawings, the following describes a video distribution system according to one embodiment of the present disclosure. As shown in FIG. 1, the video distribution system 1 includes client devices 10, a server 20, and a studio unit 30. The client devices 10, the server 20, and the studio unit 30 are communicatively interconnected over a network 11. The network 11 may include various networks such as a local area network and the Internet.

In the video distribution system 1, a distributor uses the studio unit 30 to produce a video having contents including animation of a character object based on motions of an actor. The character object is an individual of a virtual human, animal, or the like. The video produced is distributed via the server to the client devices 10 used by viewing users. The distributor may be an actor, an administrator of the studio unit 30, or others.

Figure 2:
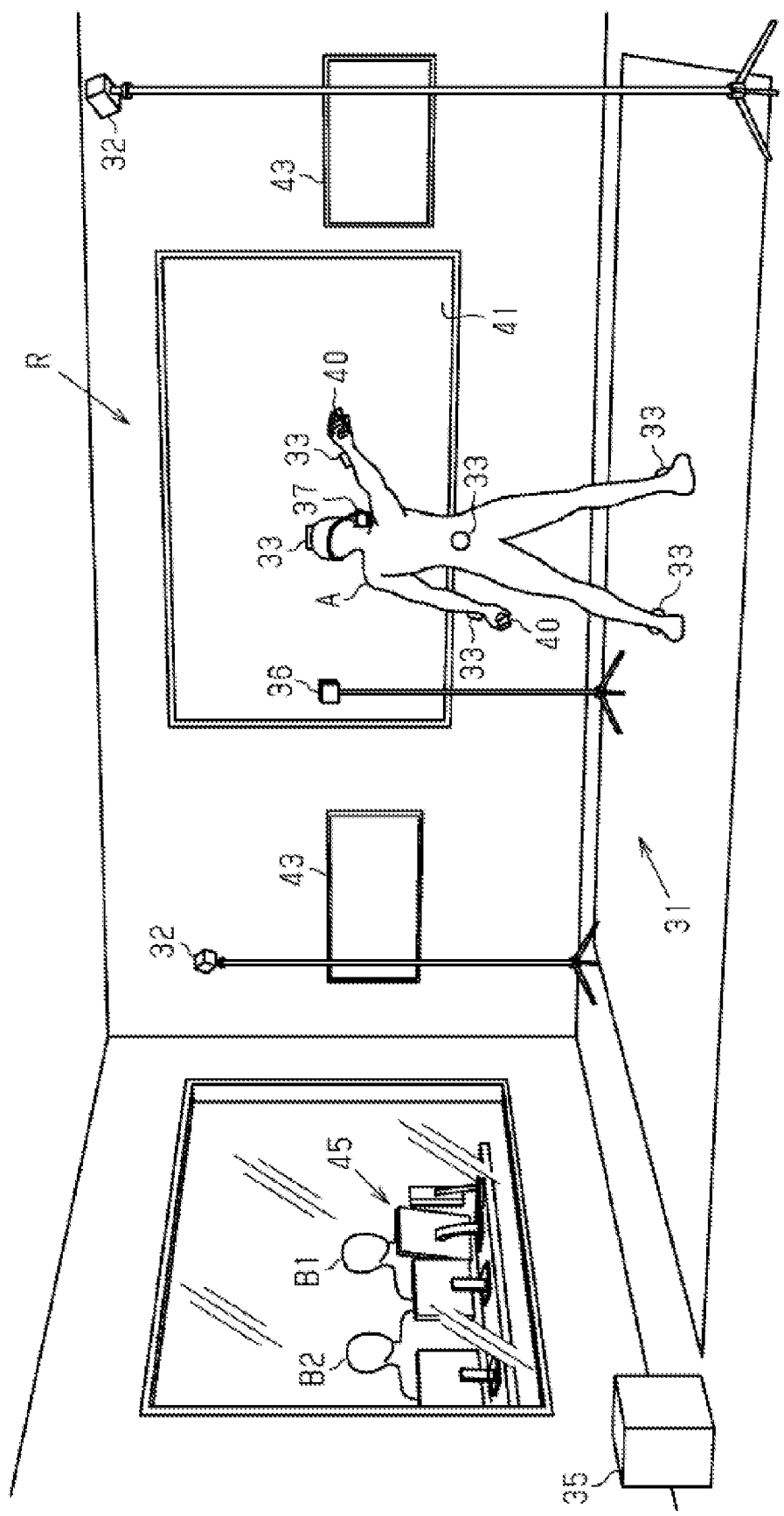
FIG. 2 is a schematic diagram of installations of a studio where a video is produced for distribution by the video distribution system of FIG. 1.

The studio unit 30 will be now outlined with reference to FIG. 2. The studio unit 30 includes a tracking system 31, a controller 40, a main display 41, a sub display 43 (display device), a microphone 44 (see FIG. 3), and a supporter computer 45.

The tracking system 31 obtains information on the motions of the actor A. The actor A is, for example, a human, animal, or moving object that gives a performance. The actor A may be, for example, an autonomous robot. A studio room R may contain a plurality of actors.

The tracking system 31 senses the position of the actor A. The tracking system 31 may also sense the facial expression of the actor A, the position of a virtual camera set in a virtual space, and the like. For example, the tracking system 31 includes external sensors 32, wearable sensors 33, and a positioning device 35. These are based on the outside-in method for sensing at least one of the orientations and the positions of the wearable sensors 33 attached to the actor A.

The wearable sensors 33 are attached to the actor A. A plurality of sensors 33 are attached to the actor A. For example, six wearable sensors 33 are attached to the left wrist, the right wrist, the left instep, the right instep, the hip, and the top of the head of the actor A, respectively. The wearable sensors 33 may be attached to the actor A via an attachment, or the actor A may wear a costume having the wearable sensors 33 attached thereto. The wearable sensors 33 may be attached to various body parts of the actor A. For example, the wearable sensors 33 may be attached to fingers to sense motions of the fingers. The number of wearable sensors 33 attached to the actor A may be less than or more than six.

The wearable sensors 33 output information for identifying the orientation and position thereof to the positioning device 35 in cooperation with the external sensors 32. One example of the external sensors 32 in the outside-in method is multi-axis laser emitters. The external sensors 32 emit a pulsed laser beam for synchronization. The wearable sensors 33 include a sensor for sensing a laser beam, and they sense the position and orientation thereof while synchronizing with the synchronization pulse. Examples of the wearable sensors 33 and the external sensors 32 include Vive Tracker™ and Vive Base Station from HTC Corporation™. Additionally or alternatively, the wearable sensors 33 may include a built-in sensor for identifying the orientation or position thereof autonomously. For example, the wearable sensors 33 may include at least one of a multi-axis acceleration sensor, a gyroscope, and a magnetic field sensor. It is also possible to combinedly use the wearable sensors 33 that cooperate with the external sensors 32 and the wearable sensors 33 that do not cooperate with the external sensors 32. Further, the wearable sensors 33 may be capable of sensing the orientation or position thereof alone, that is, without cooperating with the external sensors.

The tracking system 31 includes a viewpoint sensor 36 and a camera 37. The position of the viewpoint sensor 36 can be changed by the user. The viewpoint sensor 36 is configured in the same manner as the wearable sensors 33. The viewpoint sensor 36 outputs information for identifying the orientation and position thereof to the positioning device 35 wirelessly or via a communication cable. The viewpoint sensor 36 is set as a viewpoint of a virtual camera in a virtual space. The viewpoint sensor 36 may be supported, for example, by a stand or by a gimbal or stabilizer. The gimbal may be shaped to be graspable by an actor or other persons. By supporting the viewpoint sensor 36 with the gimbal or stabilizer, it is possible to suppress camera shake (shake in video).

The camera 37 is disposed so as to capture an image of the face of the actor A. For example, the camera 37 is attached to the head or neck of the actor A or positioned in front of the actor A. The camera 37 continuously captures images of the face of the actor A to obtain imaging data of the face of the actor A, and sends the imaging data to the server 20. The camera 37 may be a 3D camera capable of sensing the depth of a face of a person.

The microphone 44 is disposed at such a position that it can collect the voice uttered by the actor A. For example, the microphone 44 is attached to the head or neck of the actor A or positioned in front of the actor A. The microphone 44 sends signals to the server 20 in accordance with the voice.

The controller 40 is operated by the actor A. The controller 40 outputs signals to the server 20 in accordance with the operation of the actor A. The controller 40 may include a built-in sensor for identifying the orientation or position thereof autonomously. For example, the controller 40 may include at least one of a multi-axis acceleration sensor, a gyroscope, and a magnetic field sensor. Additionally or alternatively, the controller 40 may be capable of sensing the position in cooperation with the external sensors 32.

The main display 41 is configured to display a video generated by the server 20. A single main display 41 may be provided, or as shown, a plurality of main displays 41 may be provided. The video displayed on the main display 41 includes animation of the character object.

The sub display 43 is configured to display information received from the server 20 or the supporter computer 45. A single sub display 43 may be provided, or a plurality of sub displays 43 may be provided. The information sent from the server 20 or the supporter computer 45 to the main display 41 may include, for example, text information, image information, and various other information. The main display 41 and the sub display 43 are disposed at such positions as to be seen by the actor A.

The supporter computer 45 is used by one or more operators (herein referred to as "the supporters") in a room adjacent to the studio room. Since the room in which the supporter computer 45 is installed is separated from the studio room R by the glass window, the supporters using the supporter computer 45 can see the actor A. In the embodiment shown, two supporters B1, B2 are in this room. The supporter computer 45 outputs various information to the sub display 43 in accordance with the operation of the supporters. In this specification, the supporter B1 and the supporter B2 may be collectively referred to as the "supporter" when it is not necessary to distinguish them from each other. The components and functions of the studio unit 30 shown in FIG. 2 are merely an example. The studio unit 30 applicable to the disclosure may include various components that are not shown. For example, the studio unit 30 may include a projector. The projector is able to project a video distributed to the client devices 10 or other client devices on a screen.

Figure 3:
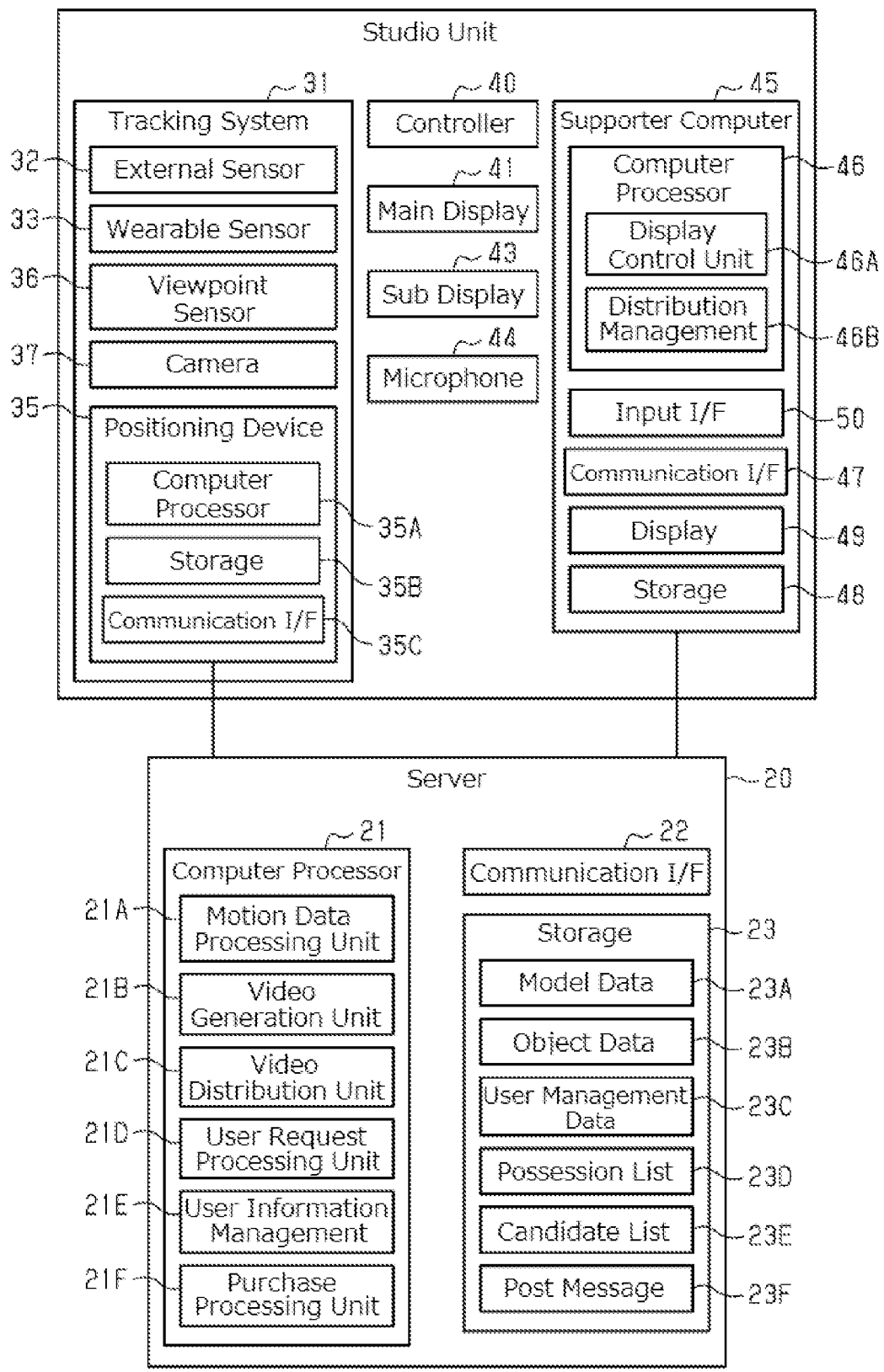
FIG. 3 is a block diagram illustrating a part of the video distribution system of FIG. 1.

The server 20 will be now described with reference to FIG. 3. The server 20 is configured to distribute to the viewing users a video that includes animation of a character object based on the motions of the actor. The character object included in the video may be motion-controlled in a virtual space. The server 20 includes a computer processor 21, a communication interface (I/F) 22, and a storage 23 (storage medium).

The computer processor 21 is a computing device which loads various programs realizing an operating system and various functions from the storage 23 or any other storage into a memory unit and executes instructions included in the loaded programs. The computer processor 21 is, for example, a CPU, an MPU, a DSP, a GPU, any other computing device, or a combination thereof. At least a part of the processes performed by the computer processor 21 may be realized by means of a circuit such as ASIC, PLD, FPGA, MCU, or the like. Although the computer processor 21 is illustrated as a single component in FIG. 3, the computer processor 21 may be a collection of a plurality of physically separate computer processors. In this specification, a program or instructions included in the program that are described as being executed by the computer processor 21 may be executed by a single computer processor or executed by a plurality of computer processors distributively. Further, a program or instructions included in the program executed by the computer processor 21 may be executed by one or more virtual computer processors.

The computer processor 21 functions as a motion data processing unit 21A, a video generation unit 21B, a video distribution unit 21C, a user request processing unit 21D, a user information management unit 21E, and a purchase processing unit 21F by executing computer-readable instructions included in the distribution program stored on the storage 23 or any other storage. At least some of the functions that can be realized by the computer processor 21 may be realized by a computer processor other than the computer processor 21 of the video distribution system 1. For example, at least some of the functions realized by the computer processor 21 may be realized by a computer processor of a computer included in the studio unit 30.

The motion data processing unit 21A generates body motion data based on tracking information obtained by the wearable sensors 33 attached to the actor. The body motion data is a time-series digital representation of at least one of the positions and orientations of body parts of the actor. The body motion data is serially generated with time as needed. For example, the body motion data may be generated at predetermined sampling time intervals.

The motion data processing unit 21A also generates face motion data, which is a time-series digital representation of motions of the face of the actor, based on captured image data of the camera 37 included in the studio unit 30. The face motion data is serially generated with time as needed. For example, the face motion data may be generated at predetermined sampling time intervals.

The video generation unit 21B applies the body motion data and the face motion data generated by the motion data processing unit 21A to a piece of model data included in the model data 23A stored on the storage 23. The video generation unit 21B thus generates animation of a character object in which the character object moves in a virtual space and changes its facial expression.

Further, the video generation unit 21B constructs a virtual space using the object data 23B stored on the storage 23, and generates a video that includes the image of the virtual space and the animation of the character object corresponding to the actor A. The video generation unit 21B may use the position of the viewpoint sensor 36 as the position of the virtual camera that is the viewpoint of the video. The relative position of the actor A relative to the position of the virtual camera is applied to the position of the character object in the virtual space. Accordingly, when the actor A changes the position or orientation of the viewpoint sensor 36 as desired, the character object in the generated video is viewed from the left side thereof, viewed from the right side thereof, viewed down from above, or viewed in other various ways. In addition, the video generation unit 21B may change the setting information (such as a focus and an angle of view) of the virtual camera based on the position of the virtual camera.

If a viewing user is associated with picture data of an avatar of the viewing user, the video generation unit 21B may generate animation of the avatar of the viewing user in addition to the animation of the character object. The avatar may be shown in the video so as to move based on the operation of the viewing user on the client device 10.

The video distribution unit 21C sends to the client devices 10 a list of videos for distribution and distributes the videos generated by the video generation unit 21B. The video distribution unit 21C may distribute in real time the video being taken in the studio room R or distribute a previously finished video (recorded video) in accordance with a distribution schedule or the like. The video distribution unit 21C may be configured to be able to distribute a plurality of videos in the same period of time. For example, the video distribution unit 21C may distribute the video of "character X" performed by an actor A1 and the video of "character Y" performed by an actor A2 from the same starting time (e.g., "20:00") or in overlapping time periods. In response to a list display request from a client device 10, the video distribution unit 21C sends to the client device 10 a list of videos that can be delivered. When receiving a video delivery request from the client device 10, the video distribution unit 21C sends the video selected by the viewing user to the client device 10 based on the video delivery request.

The user request processing unit 21D receives a display request for an object and a display request for a post message from a client device 10 of a viewing user, and performs processing in accordance with the display requests. The viewing user is able to send a display request for an object to the server 20 by operating his/her client device 10. The object may be a gift object provided from the viewing user to the contents. The gift object is a digital gift from the viewing user to the actor or the like. For the viewing user to request display of the gift object, some or no price may be required to be paid. The viewing user may pay a price when the gift object is displayed in response to the display request. The gift object may be displayed in the virtual space continuously. The gift object may be displayed in the virtual space temporarily for temporal staging in the virtual space. The display request for a gift object may include the user ID of the viewing user and the identification information (object ID) of the object for which the display request is sent.

When receiving a display request for a gift object from a viewing user, the user request processing unit 21D determines whether or not the actor or the supporter needs to make a judgment as to the display of the gift object. If the user request processing unit 21D determines that the actor or the supporter does not need to make a judgment as to the requested display of the gift object, the user request processing unit 21D causes the video generation unit 21B to display in the virtual space the object for which display is requested.

On the other hand, if the user request processing unit 21D determines that the actor or the supporter needs to make a judgment as to the requested display of the gift object, the user request processing unit 21D displays on the sub display 43 the gift object for which display is requested. When the actor or the supporter gives an instruction to display the gift object for which display is requested, the user request processing unit 21D causes the video generation unit 21B to display the object for which display is requested.

The user request processing unit 21D also performs a process for displaying a post message received from the client device 10 in the video. The post message includes the identification information (user ID or terminal ID) of the viewing user and the posting date and time, in addition to the content of the message.

When receiving the post message, the user request processing unit 21D determines whether or not the post message can be displayed in the current scene. If the user request processing unit 21D determines that the received post message can be displayed, the user request processing unit 21D causes the video generation unit 21B to display the post message in a predetermined region in the video. The user request processing unit 21D also displays the post message and the attribute information of the post message on the sub display 43.

The user information management unit 21E obtains the viewing situation of the viewing user and records the viewing situation on the storage 23 in association with the viewing user. The user information management unit 21E records as a history the video being viewed by the viewing user on a viewing application, that is, the "room" of the actor "visited" by the viewing user, in association with the user ID of the viewing user. The user information management unit 21E also groups the viewing users in accordance with the viewing situation of each viewing user.

The purchase processing unit 21F receives from the client device 10 a display request for purchasable contents such as a gift object related to the video, upon operation of the viewing user. After receiving the display request for purchasable contents, the purchase processing unit 21F sends the information on the purchasable contents to the client device 10. The information on the purchasable contents may include the types, images, and prices of the purchasable contents and various information necessary for purchase. The viewing user refers to the information of the purchasable contents displayed on the client device 10 and selects a desired purchasable content. When the viewing user has selected a purchasable content, the client device 10 sends a purchase request for the purchasable content to the server 20. The purchase processing unit 21F performs a payment process based on the purchase request. When the payment process is completed, the server 20 records the purchased content as being possessed by the viewing user. The purchasable content may be other than the gift object, for example, an object related to viewing of the video other than the gift object, a right to view the video at a different image quality, or a right to view a two-dimensional image or a three-dimensional image. The purchasable content may also be a video itself. The sales of the purchasable gift object and other contents are dispensed to the distributor. A part of the sales may be dispensed to the administrator of the studio unit 30.

The communication I/F 22 may be implemented as hardware, firmware, or communication software such as a TCP/IP driver, or a combination thereof. The server 20 is able to send and receive data to and from other devices via the communication I/F 22.

The storage 23 is a storage device accessed by the computer processor 21. The storage 23 is, for example, a magnetic disk, an optical disk, a semiconductor memory, or various other storage devices capable of storing data. Various programs may be stored on the storage 23. At least some of the programs and various data that can be stored on the storage 23 may be stored on a storage that is physically separated from the server 20.

Next, a description is given of the positioning device 35 and the supporter computer 45 of the studio unit 30. The positioning device 35 includes a computer processor 35A, a storage 35B (storage medium), and a communication interface (I/F) 35C. Similarly to the computer processor 21 of the server 20, the computer processor 35A may be any computing device such as a CPU. Similarly to the storage 23 of the server 20, the storage 35B may be any storage device such as a magnetic disk. Similarly to the communication interface 22 of the server 20, the communication interface (I/F) 35C may be any driver, software, or combination thereof for communicating with other devices. The computer processor 35A executes a position detecting program stored on the storage 35B or any other storage, thereby obtaining tracking information from the external sensors 32 or the wearable sensors 33 and identifying the positions of the wearable sensors 33. Also, the computer processor 35A executes a position detecting program stored on the storage 35B or any other storage, thereby obtaining tracking information from the external sensors 32 or the viewpoint sensor 36 and identifying the position of the viewpoint sensor 36. The positioning device 35 sends the identified position to the server 20.

The supporter computer 45 includes a computer processor 46, a communication I/F 47, a storage 48 (storage medium), a display 49, and an input interface 50.

Similarly to the computer processor 21 of the server 20, the computer processor 46 may be any computing device such as a CPU. Similarly to the communication I/F 22, the communication I/F 47 may be, a driver, software, or a combination thereof for communicating with other devices. Similarly to the storage 23, the storage 48 may be a storage device capable of storing data such as a magnetic disk. The storage 48 stores various programs. The display 49 may be a liquid crystal display, an organic EL display, an inorganic EL display or any other display device capable of displaying images. The input interface 50 may be any pointing device that receives input from the supporter such as a mouse and a keyboard.

The computer processor 46 functions as a display control unit 46A and a progress management unit 46B by executing computer-readable instructions included in a program stored on the storage 48 or the like. At least some of the functions that can be realized by the computer processor 46 may be realized by a computer processor other than the computer processor 46 of the video distribution system 1. Also, at least some of the functions described herein to be realized by the computer processor 46 may be realized by, for example, the computer processor 21 of the server 20.

The display control unit 46A is configured to display on the main display 41 or the sub display 43 such a view that can be seen by the actor but cannot be seen by the viewing user and add various information to the video distributed to the viewing users, in accordance with various input operation by the supporter via the input interface 50.

The supporter computer 45 may be configured to be capable of changing the settings of the components of the studio unit 30 in accordance with the operation by the supporter. The supporter computer 45 can change, for example, the setting of the interval of scanning performed by the external sensors 32, the setting of the position or orientation of the wearable sensors 33, and various settings of other devices. The supporter is able to input a message to the supporter computer 45, and the inputted message is displayed on the main display 41.

The client device will now be described with reference to FIG. 4. The client device 10 is an information processing device such as a smartphone. In addition to the smartphone, the client device 10 may be a mobile phone, a tablet, a personal computer, an electronic book reader, a wearable computer including a head-mounted display, a game console, or any other information processing device that is capable of playing videos.

The client device 10 includes a computer processor 12, a storage 13 (storage medium), an input interface (I/F) 14, a communication interface (I/F) 15, and a display 16. Similarly to the computer processor 21 of the server 20, the computer processor 12 may be any computing device such as a CPU. Similarly to the storage 23 of the server 20, the storage 13 may be any storage device such as a magnetic disk. The storage 13 stores an application program for viewing videos distributed from the server 20. The input I/F 14 may be any input interface that receives input from the viewing user such as a touch panel. Similarly to the communication I/F 22, the communication I/F 15 may be, a driver, software, or a combination thereof for communicating with other devices. The display 16 may be any display device capable of displaying images, such as an organic EL display or a liquid crystal display, that is integrated with a touch panel, for example.

When receiving operation of the viewing user via the input I/F 14, the client device 10 starts the viewing application program implemented on the client device 10. The viewing application has at least a function for playing the videos, and it may have any other function additionally. The computer processor 12 executes computer-readable instructions included in the viewing application program and obtains a list of videos for distribution from the server 20. The client device 10 displays the obtained list on the display. The viewing user selects one of the videos included in the list. When receiving selection operation of the viewing user, the client device 10 sends to the server 20 a video delivery request for requesting delivery of the selected video. Alternatively, the client device 10 may be configured to start a web browser stored on the storage 13, access the server 20 via the web browser, and display on the display 16 a web page written in a markup language such as HMTL or XML. The web page contains the list of videos. Alternatively, the client device 10 may display the list of videos by using both the viewing program and the web browser (in-application browser) stored on its storage 13.

When receiving the data of the video from the server 20, the client device 10 displays the video on the display 16 based on the received data. The viewing user is able to input a message regarding the distributed video via the input I/F 14 of the client device 10 to post the message to the server 20. The message posted from each viewing user may be displayed superimposed on the video. In this way, interaction is accomplished between the actor and the viewing users and between the viewing users.

Next, a description is given of various data stored on the storage 23 of the server 20. The storage 23 stores the model data 23A, the object data 23B, user management data 23C, a possession list 23D, a candidate list 23E, and a post message 23F. The storage 23 may also store the video being distributed or videos having been already distributed by the video distribution system 1.

The model data 23A is model data for generating animation of a character. The model data 23A may be three-dimensional model data for generating three-dimensional animation, or it may be two-dimensional model data for generating two-dimensional animation. The model data 23A includes, for example, rig data (also referred to as "skeleton data") representing a skeleton of a character, and surface data representing the shape or texture of a surface of the character. The model data 23A may include two or more different pieces of model data. Each piece of model data may either include different rig data or include the same rig data. Each piece of model data may either include different surface data or include the same surface data. In the illustrated embodiment, in order to generate a character object corresponding to the actor, the model data 23A includes at least two types of model data different from each other.

The object data 23B includes asset data used for constructing a virtual space in the video. The object data 23B includes data for rendering a background of the virtual space in the video, data for rendering various objects displayed in the video, and data for rendering any other objects displayed in the video. The object data 23B may include object position information indicating the position of an object in the virtual space.

In addition to the above, the object data 23B may include gift objects displayed in the video in response to a display request from viewing users of the client devices. The gift objects may include an effect object, a decorative object, and a normal object. The viewing users may possess some of the gift objects for a price and the others for no price. Moreover, an upper limit may be set for the number of objects that a viewing user is allowed to purchase or the amount of money that the viewing user is allowed to spend for objects.

The effect object is an object that affects the impression of the entire view of the distributed video, and is, for example, an object representing confetti or an object representing a firework. The object representing confetti may be displayed on the entire view, which can change the impression of the entire view. For example, the effect object may be represented by a particle system that represents an event formed by moving particles. In the particle system, a duration of display may be set for each particle. The effect object may be either a static object or a dynamic object. The effect object may be displayed so as to overlap with the character object, but unlike the decorative object, it is not displayed in association with a specific boy part of the character object.

The decorative object is an object displayed in the view in association with a specific boy part of the character object. For example, the decorative object may be displayed in the view such that it contacts with a specific body part of the character object with which it is associated. The decorative object may be displayed in the view such that it covers a portion or whole of a specific body part of the character object with which it is associated.

The decorative object is an object that can be attached to a character object, for example, an accessory (such as a headband, a necklace, an earring, etc.), clothes (such as a T-shirt), a costume, and any other object which can be attached to the character object. The object data 23B corresponding to the decorative object may include attachment position information indicating which body part of the character object the decorative object is associated with. The attachment position information of a decorative object may indicate to which body part of the character object the decorative object is attached. For example, when the decorative object is a headband, the attachment position information of the decorative object may indicate that the decorative object should be attached to the "head" of the character object. When the decorative object is a T-shirt, the attachment position information of the decorative object may indicate that the decorative object should be attached to the "torso" of the character object.

The decorative object is added to the list stored on the storage 23 or any other storage by the server 20, and then it is attached to the character object when it is selected by the actor or the supporter. A viewing user feels close to the character object when the character object wears the decorative gift object the viewing user sent. On the other hand, when the viewing user requests display of a decorative object but the actor or the supporter does not select a corresponding decorative object, the decorative object is not attached to the character object. When the actor is to select a decorative object, the actor refers to the list displayed on the sub display 43 and selects the decorative object by using a pointing device such as the controller 40 or providing an instruction to the supporter. The supporter refers to the list displayed on the supporter computer 45 and selects the decorative object using the input interface 50.

The normal object is a gift object other than the decorative object, designed to be placed in the virtual space as a physical object. Examples of the normal object include objects representing a stuffed toy or a bouquet. The normal object may be displayed so as to overlap with the character object, but unlike the decorative object, it is not displayed in association with a specific body part of the character object. For example, it is possible that the actor can change the position of the normal object, whereas the actor cannot change the position of the effect object. It is also possible that the duration of display of the normal object is different from that of the effect object.

A duration of display may be set for each type of gift objects. For example, the duration of display of the decorative object may be set longer than that of the effect object or the normal object. For example, the duration of display may be set to 60 seconds for the decorative object, 5 seconds for the effect object, and 10 seconds for the normal object.

Figures 4, 5, 6:
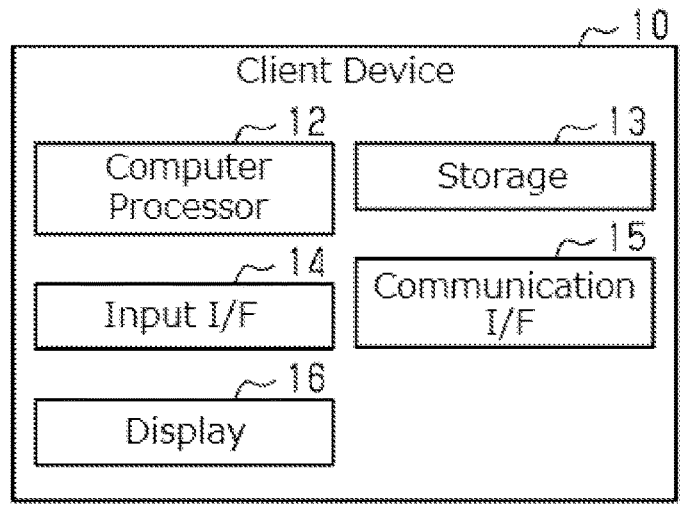
FIG. 4 is a block diagram illustrating a client device of FIG. 1.
FIG. 5 illustrates an example of user management data.
FIG. 6 illustrates an example of a possession list.

As shown in FIG. 5, the user management data 23C contains, for each content of a character object, information on viewing users who have viewed the video. The contents are basically distributed for multiple times. For example, "distributor A" distributes "content P" featuring "character P" for multiple times. Also, "distributor B" distributes "content Q" featuring "character Q" for multiple times. The contents do not necessarily differ for each character object. For example, videos featuring the same character object but not related to each other may constitute separate contents. The user management data 23C contains records of activities of viewing users after the start of initial distribution of contents. The activities are behaviors of the viewing users on the contents and may include at least one of: a history of viewing the contents, a status of posting messages to the contents, a status of providing gift objects to the contents, and a status of payment to the contents. If "viewing user C" has viewed "content P" and "content Q" the user management data 23C records the activities of "viewing user C" on "content P" and the activities of "viewing user C" on "content Q."

The user management data 23C contains, for each viewing user of the contents, identification information (user ID) of the viewing user, a group to which the viewing user belongs, a room visit status of the viewing user, a ranking of the viewing user, and a payment status of the viewing user.

In FIG. 5, the "Group" corresponding to a content indicates the group to which a viewing user belongs for the content. The number of the groups of the viewing users is any plural number. Each viewing user is assigned to a group based on the conditions related to his/her activities for the contents he/she has viewed. The conditions for the assignment to the groups may be set previously by the distributor or the administrator of the studio unit 30. For example, based on the conditions related to activities for a content, the viewing users may be assigned to a group of viewing users who are avid fans of the content or a group of viewing users less related to the content such as those viewing the content for the first time.

The conditions for assignment to the groups may include at least one of: the number of times of viewing the content, the number of times of posting a post message to the content, the number of times of sending a gift object to the content, and the amount of money paid to the content. For example, if the condition for assignment to the groups is the number of times of viewing, viewing users who have viewed "content P" for not less than a predetermined number of times (e.g., ten times) are assigned to a first group (e.g., "VIP group"), and viewing users who have viewed "content P" for less than the predetermined number of times are assigned to a second group. Alternatively, if the condition for assignment to the groups is the number of times of posting a message, viewing users who have posted a message for not less than a predetermined number of times (e.g., 20 times) are assigned to a first group, and viewing users who have posted a message for less than the predetermined number of times are assigned to a second group. If the condition for assignment to the groups is the number of times of providing a gift object, viewing users who have provided a gift object for not less than a predetermined number of times (e.g., five times) are assigned to a first group, and viewing users who have provided a gift object for less than the predetermined number of times are assigned to a second group. If the condition for assignment to the groups is the amount of money paid, viewing users who have paid not less than a predetermined amount of money are assigned to a first group, and viewing users who have paid less than a predetermined amount of money are assigned to a second group. The viewing users may be grouped with combined conditions of: the number of times of viewing the content, the number of times of posting a post message to the content, the number of times of sending a gift object to the content, the amount of money paid to the content, and any other conditions.

The conditions for grouping may be other than those described above. Examples of such conditions include a use status (such as the frequency of use, the number of years of use, and the last date and time of use) and user attributes (such as the age, sex, occupation, place of residence, and language). Further, these conditions may be combined for grouping.

In FIG. 5, the "Room Visit Status" associated with a content is data indicating whether or not a viewing user has logged in to the video distribution system 1 and is viewing the content. When the content is currently being delivered to the client device 10 of the viewing user, the field "Room Visit Status" contains data indicating "visiting." When the content is currently not being delivered to the client device 10, the field "Room Visit Status" contains data indicating "left." In addition, when the content is delivered to the client device 10, and then the viewing user suspends viewing the video and does not resume it for a predetermined period of time, the data indicating "Left" may be stored. If the content of a distributed video has not yet been viewed by the viewing user, the data indicating "Unviewed" may be stored instead of the data indicating "Left."

In FIG. 5, the "Ranking" associated with a content is data indicating the ranking of a viewing user for the content. The method of ranking may be determined by the administrator of the studio unit 30 or the distributor. For example, the ranking may be determined in accordance with the number of times of viewing the content, the number of times of posting a post message to the content, the number of times of sending a gift object to the content, and the amount of money paid to the content. The population for the ranking may be all the viewing users of the content or may be at least one of a plurality of groups (e.g., the first group).

In FIG. 5, the "Payment Status" associated with a content is data indicating the payment status of a viewing user for the content. The data of "Payment Status" include "Paid" and "Not Paid." The payment status may be replaced with the amount of paid money.

As shown in FIG. 6, the possession list 23D is a list of objects (possessed objects) possessed by a viewing user. The possession list 23D may include identification information of possessed objects (object IDs) in association with the viewing user. The possessed objects may be objects different for each content or objects common to different contents, or the possessed objects may include both these objects. For the objects different for each content, the possession list 23D of the viewing user stores identification information of an object for each content. The possession list 23D is stored continuously for a plurality of distributed videos. The possession list 23D may be newly generated or reset each time a content for one distribution is distributed.

As shown in FIG. 7, the candidate list 23E is a list of gift objects associated with a video. The candidate list 23E is preferably generated or reset each time a video is distributed for one view. When the viewing user sends a display request for a gift object to the video, information on the gift object is added to the candidate list 23E. The candidate list 23E may include identification information (user ID) of the viewing user who sent the gift object, identification information (object ID) of the gift object, the type of the gift object (decorative object, effect object, normal object), the sending date and time of the gift object, and the selection status of the gift object. If the gift object is a decorative object, the selection status of the gift object indicates whether or not the decorative object has been selected by the actor or the supporter. When the decorative object has been selected, the field "Selection Status" stores data indicating "Selected," and when the decorative object has not been selected, the field "Selection Status" stores data indicating "Unselected." If the gift object is not a decorative object, the field "Selection Status" stores data indicating "Unselected" or some data other than "Unselected" and "Selected."

As shown in FIG. 8, the post message 23F may include information on messages posted to videos by the viewing users. The post message 23F may include, for each content, identification information (user ID) of the viewing user, the group to which the viewing user belongs, the message text, and the posting date and time of the message. If the group to which the viewing user belongs is recorded on the user management data 23C, it may not be recorded on the post message 23F. The post message 23F may be newly generated or reset each time a content for one distribution is distributed.

Next, a description is given of a view referred to by the viewing user, the actor, and the supporter, along with the flow of distribution of the content. When the viewing application program is started by the operation of the viewing user, the client device 10 requests a list of contents from the server 20. The server 20 sends to the client device 10 information for displaying a list of contents.

Figure 9:
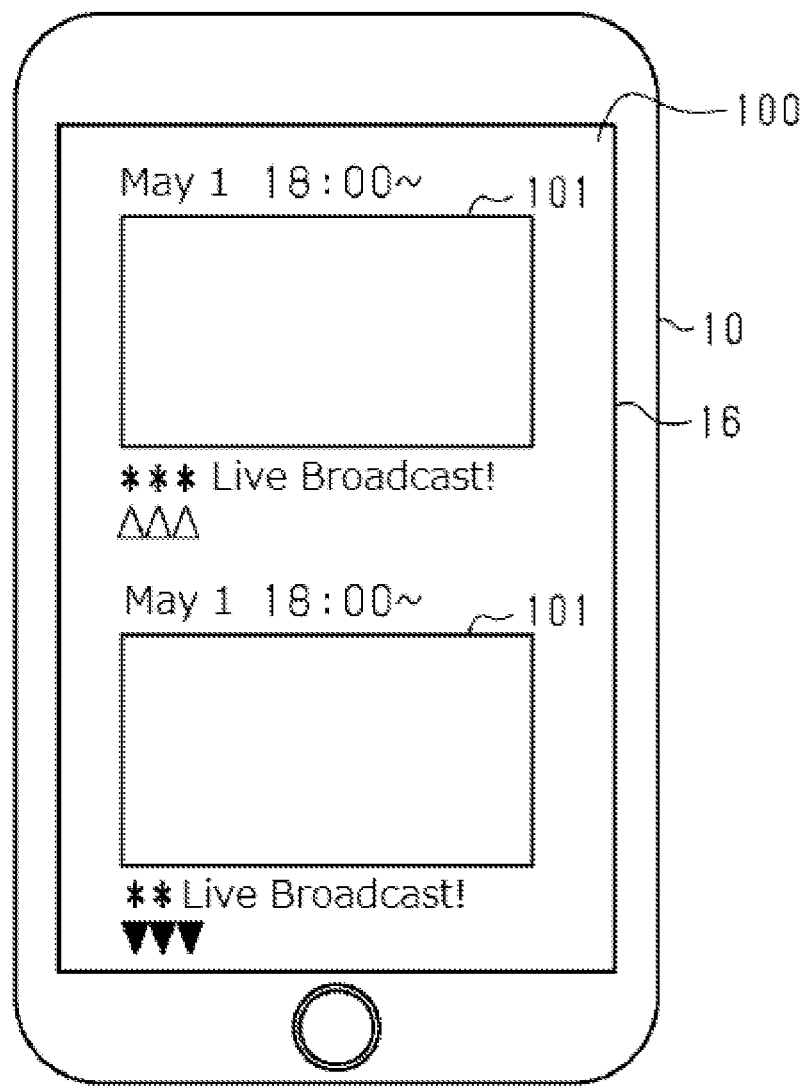
FIG. 9 illustrates an example of a video displayed on the client device of FIG. 4.

As shown in FIG. 9, the display 16 of the client device 10 displays a content list view 100. The content list view 100 contains a list of contents being distributed or to be distributed This list includes the image 101 of the content, the distribution date and time of the content, the content name, and the name of a character appearing in the content, and so on.

The viewing user selects one content from the list. The client device 10 sends to the server 20 a delivery request for the selected content. When receiving the delivery request for the content from the client device 10, the server 20 delivers the content corresponding to the delivery request to the client device 10. The client device 10 receives the content and displays the video.

Figure 10:
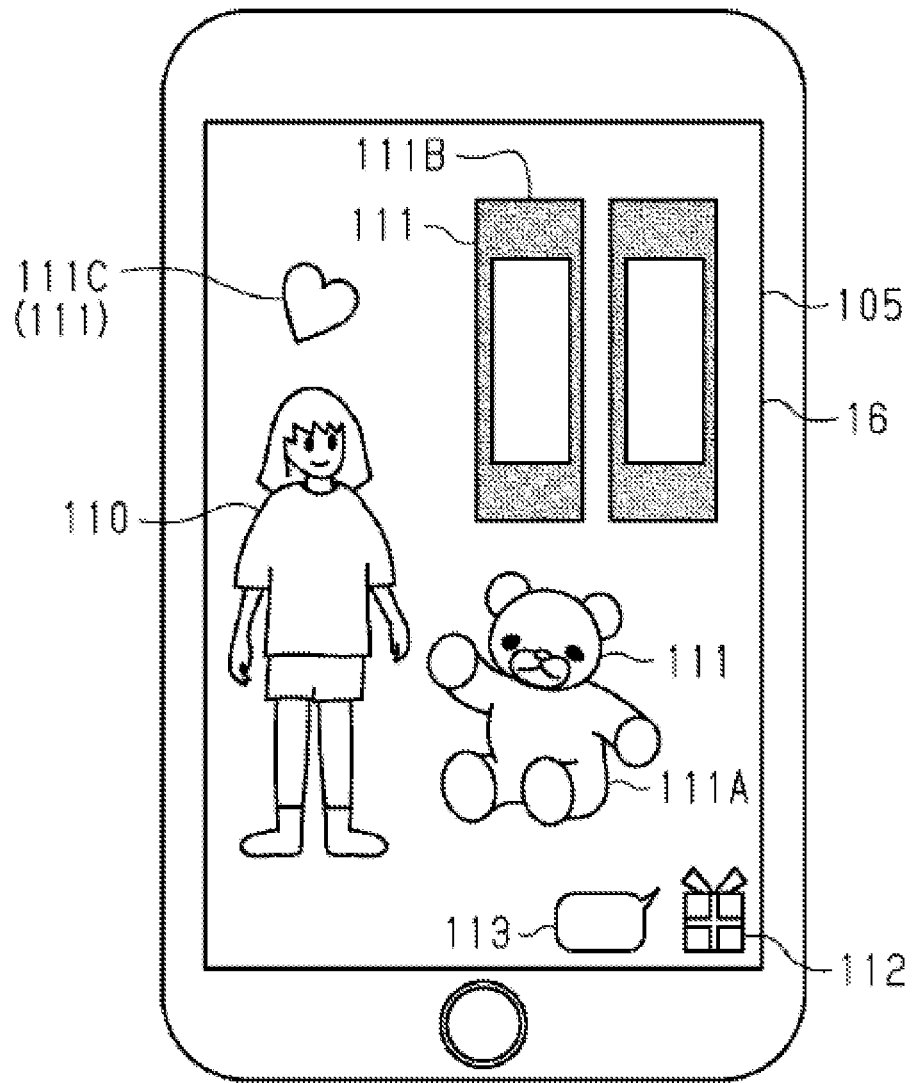
FIG. 10 illustrates an example of a video displayed on the client device of FIG. 4.

As shown in FIG. 10, the display 16 of the client device 10 displays a video playing view 105. The video playing view 105 contains a virtual space viewed from a camera viewpoint set at the viewpoint sensor 36, and a character object 110 reflecting the motions of the actor. The video playing view 105 also contains a gift selection portion 112 and a posting selection portion 113.

When the viewing user selects the gift selection portion 112 of the video playing view 105, the client device 10 retrieves the possession list 23D from the server 20. Alternatively, the client device 10 retrieves the possession list 23D that was previously retrieved from the server 20 and stored on the storage 13. Further, the client device 10 generates a list of gift objects possessed by the viewing user based on the possession list 23D and displays the generated list.

When the viewing user selects a normal object from the list of gift objects, the client device 10 sends a display request for the normal object to the server 20. The display request includes identification information (object ID) of the selected normal object and identification information of the user (user ID). Since a display request for a gift object needs to be sent with identification information of the user, the viewing user is required to log in to the video distribution system 1 or a separate user authentication system cooperating with the video distribution system 1 before sending the display request.

In response to the display request for the normal object, the server 20 displays the normal object 111 in the video distributed to the viewing user who sent the display request and other viewing users. In the illustrated embodiment, a plurality of types of normal objects 111A to 111C are displayed. The normal object 111A is a teddy bear object, and it is placed at a predetermined position in the virtual space. The normal object 111A may be movable within the virtual space when contacted by the character object 110, or specifically, for example, when the character object 110 performs a motion to grasp the normal object 111A. The normal object 111B is a hanging scroll object, and it is displayed at a predetermined position in the virtual space. The normal object 111C is able to move within the virtual space. After moving within the virtual space, the normal object 111C may eventually stop at a position reached or disappear from the view.

Figure 11:
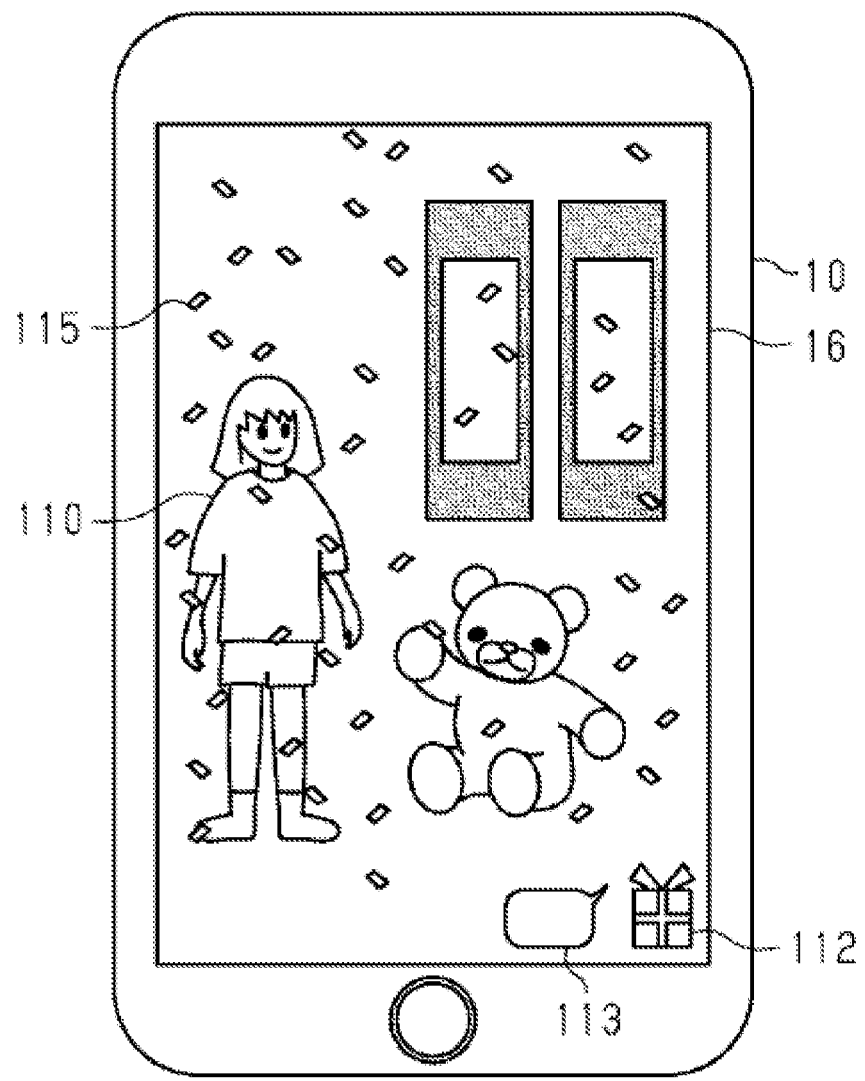
FIG. 11 illustrates an example of a video displayed on the client device of FIG. 4.

As shown in FIG. 11, when the viewing user sends a display request for an effect object, the effect object is displayed in the video playing view 105, as with the display request for a normal object. In the illustrated embodiment, the effect object 115 corresponding to confetti is displayed.

Figure 12:
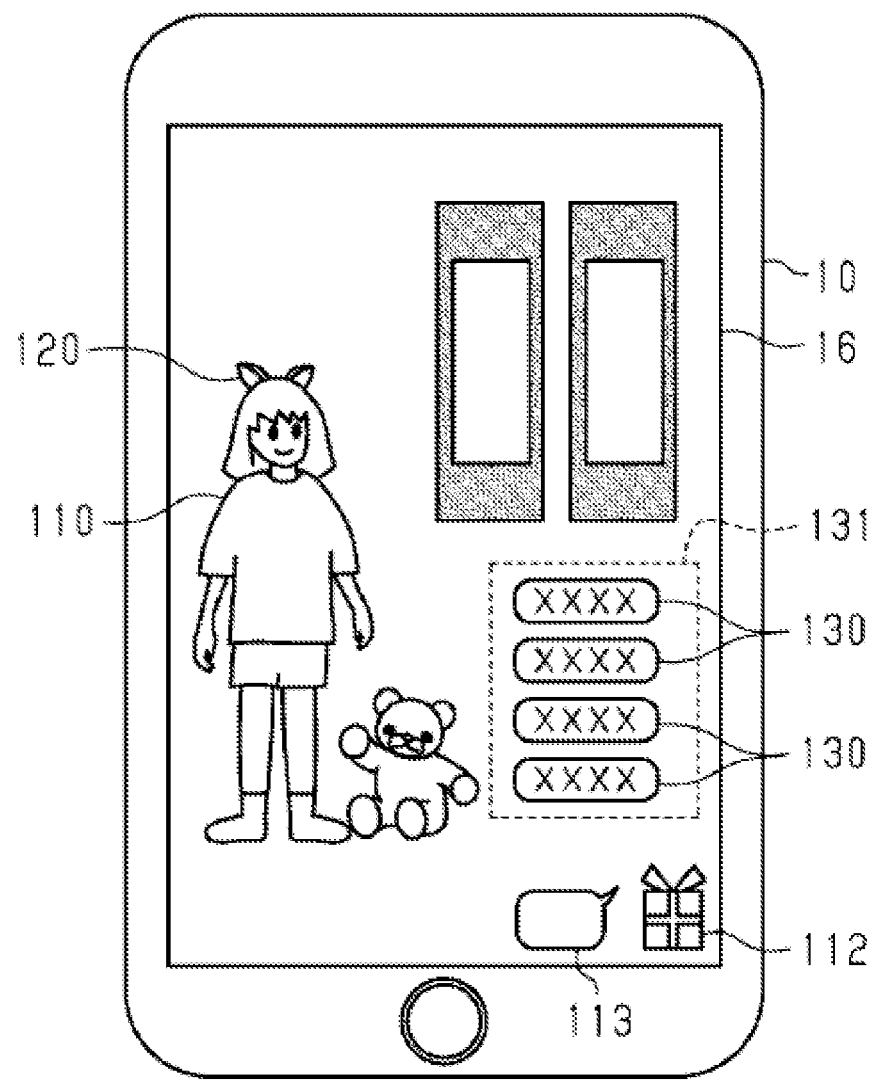
FIG. 12 illustrates an example of a video displayed on the client device of FIG. 4.

As shown in FIG. 12, when the viewing user sends a display request for a decorative object, the decorative object 120 is displayed in the video playing view 105, as with the display request for a normal object. The decorative object 120 is displayed in the video playing view 105 in association with a specific body part of the character object. The decorative object 120 may be displayed such that it contacts with the specific body part of the character object. For example, the decorative object 120 representing ears of a cat (cat ears) is associated with the middle of the head of the character object, and therefore, it is attached to the middle of the head of the character object 110. When the character object 110 moves, the decorative object 120, which remains associated with the character object 110, also moves to follow the head as if it is attached to the character object 110.

If a video includes a period of time during which post messages are allowed to be posted, when any one of the viewing users viewing the video selects the posting selection portion 113, a message input view is displayed separately from the video playing view 105 or in the video playing view 105. When a message is input to the input view, the information of the input message is sent to the server 20 as a post message.

When receiving the post message within the period of time during which posting is allowed, the server 20 sends video data containing the post message to the client device 10. The client device 10 causes the post message 130 to be displayed in the video playing view 105. The post message 130 is displayed in a predetermined message display region 131. The post messages 130 are arranged in the order of the posting date and time. For example, the newest post message 130 is displayed at the uppermost portion of the message display region 131. When the server 20 receives a new post message, the post message 130 displayed at the uppermost portion is moved down, and the new post message is displayed at the uppermost portion. The post message having reached the lowermost portion of the message display region 131 is moved further down and disappears when a new message is added at the uppermost portion. Alternatively, only one post message may be displayed in the message display region 131.

Figure 13:
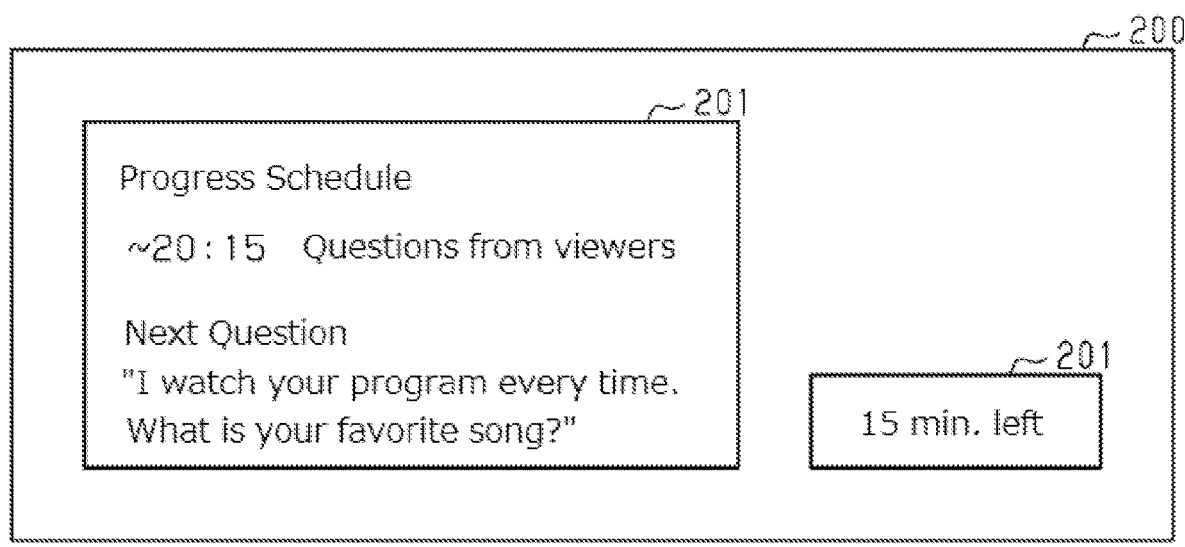
FIG. 13 illustrates an example of a view displayed on a display seen by an actor.

Next, a description is given of a view referred to by the actor in the studio room R. FIG. 13 shows an example of a notification view 200 displayed on the sub display 43 installed in the studio room R. The notification view 200 may contain notification 201 to the actor. The data for displaying the notification view 200 may be generated by the supporter computer 45 either automatically or via input operation of the supporter. In the illustrated embodiment, the notification 201 includes the remaining time, the schedule, the information notified to the actor, and so on. The actor gives the performance, while referring to the notification view 200. The notification 201 may be displayed on the screen of the main display 41 such that it is superimposed on or placed adjacent to the animation of the character object.

Figure 14:
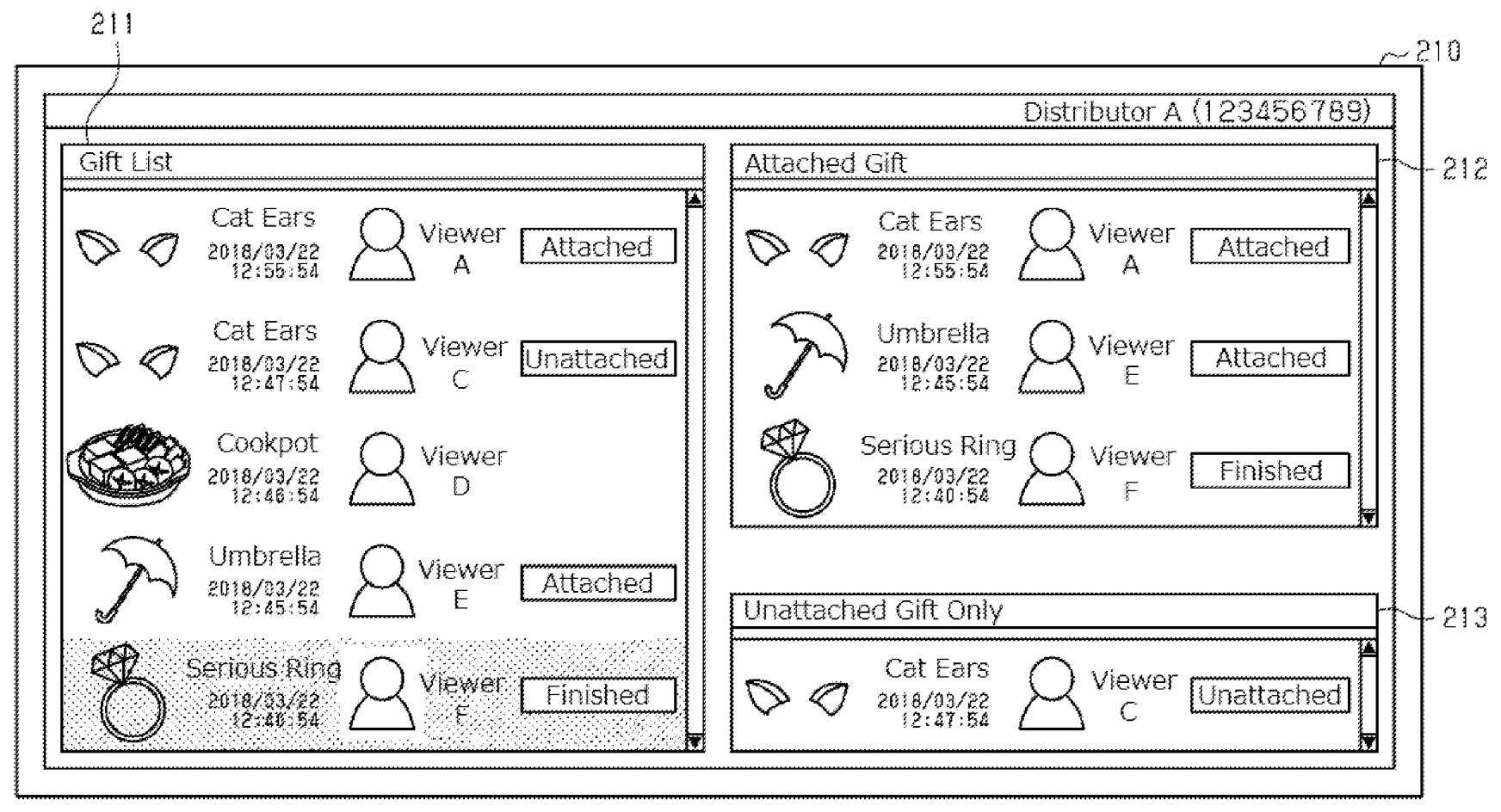

FIG. 14 shows an example of a gift list view 210 displayed on the sub display 43. The gift list view 210 contains lists (object information) of gift objects for which a display request has been sent from the viewing users, and these gift objects are displayed in association with the viewing users. The gift list view 210 contains a gift list 211 including all the gift objects, an attached gift list 212 (first list), and an unattached gift list 213 (second list).

The gift list 211 may include the image of a gift object for which a request has been sent from the viewing user during distribution of the video, the name of the gift object, identification information of the viewing user (account name or user ID of the user) who has sent the display request for the gift object, and the attachment status. The gift list 211 includes the decorative objects, and preferably also includes other types of gift objects. The identification information of the viewing user may be an avatar of the viewing user. In the illustrated embodiment, the gift list 211 includes a normal object, an effect object, and decorative objects, that is, all the types of gift objects.

For a decorative object included in the gift list 211, the "Attachment Status" in the gift list 211 indicates whether or not a character object wears the decorative object. When the character object wears the decorative object, the attachment status is "Attached." When the character object no longer wears it, the attachment status is "Finished." In a content being distributed, decorative objects no longer worn by the character object are provided with the status of "Finished." The actor and the supporter can refer to the gift list 211 to confirm the gift objects for which a request has been sent from the viewing users in a period from the time at which the distribution of the video was started to the present time. Since the gift list 211 contains the identification information of the user in association with the gift object, the actor can send a message (such as "Thank you, A") via the voice in the video to the viewing user who has sent a display request for the gift object. This enables the actor to enhance the communication with the viewing user, leading to increased satisfaction of the viewing user.

The duration of display may be set for a decorative object. When the duration of display of the decorative object has elapsed, the decorative object shown in the gift list 211 is provided with the selection status of "Finished" and grayed out or shown in some other way different than the decorative objects of which the duration of display has not elapsed. The decorative object disappears from the video when its duration of display has elapsed.

When different viewing users requested display of the same decorative object in a video being distributed and only one of the decorative objects is worn by the character object, this decorative object may be provided with the attachment status of "Attached" and the other may remain with the attachment status of "Unattached." Alternatively, both these decorative objects may be provided with the attachment status of "Attached."

The attached gift list 212 includes decorative gift objects selected by the actor or the supporter and currently worn by the character object. The items of the attached gift list 212 are the same as those of the gift list 211. Among the decorative objects currently attached, one for which display was requested at the latest date and time, or the newest one is displayed at the uppermost portion of the attached gift list 212, and the others are arranged downward therefrom in the descending order of the date and time at which the display was requested therefor. The actor and the supporter refer to the attached gift list 212 to confirm the decorative objects worn by the character object. Therefore, the actor can send a message representing, for example, his/her feeling about the decorative object attached to the character object (such as "I love these cat ears") to the viewing user via the voice in the video. This enables the actor to enhance the communication with the viewing user with the medium of the decorative object, leading to increased satisfaction of the viewing user who offered the decorative object and urging the viewing users other than this viewing user to offer a decorative object.

When the duration of display of the decorative object has elapsed, the decorative object is erased from the attached gift list 212, or it is grayed out or shown in some other way different than the decorative objects of which the duration of display has not elapsed.

The unattached gift list 213 includes decorative gift objects for which display is requested by the viewing user and which is thereafter not selected by the actor or the supporter. The items of the unattached gift list 213 are the same as those of the gift list 211. The decorative object for which display was requested at the earliest date and time, or the decorative object remaining unattached for the longest time is displayed at the uppermost portion of the unattached gift list 213, and the others are arranged downward therefrom in the ascending order of the date and time at which the display was requested therefor. In this way, since the list of unattached decorative gift objects is displayed, the actor or the supporter can confirm the decorative objects that were offered by the viewing users and have not been selected. Since the actor can readily refer to the unselected decorative objects, the actor can efficiently select as many decorative objects as possible. Further, since decorative objects for which display was requested at an earlier date and time are displayed in an upper portion, it can be inhibited to omit a decorative object from selection.

Among the decorative gift objects, one having a limited duration of display set therefor disappears from the video playing view 105 when the duration of display has elapsed after it is attached to the character object. The decorative object that has disappeared is erased from the attached gift list 212. In the gift list 211, the selection status of the decorative object that has disappeared from the video playing view 105 is updated to "Finished." The duration of display of the gift object may be included in the gift list 211, the attached gift list 212, and the unattached gift list 213.

When any one of the decorative gifts included in the unattached gift list 213 is selected by the actor or the supporter, the server 20 erases information on the selected decorative object from the unattached gift list 213 and adds it to the attached gift list 212. Also, the selection status of the selected decorative gift object in the gift list 211 is updated from "Unselected" to "Attached."

In this way, since the gift list view 210 contains the attached gift list 212 and the unattached gift list 213 that are separate from each other, the actor or the supporter can confirm the selected decorative objects and the unselected decorative objects and thus can select the decorative objects efficiently even when the viewing users offer a large number of decorative objects. The chances for communication with the viewing users can be increased by selecting as many decorative objects as possible to be attached to the character object within a limited distribution time. This increases satisfaction of the viewing users with the distributed video.

Figure 15:
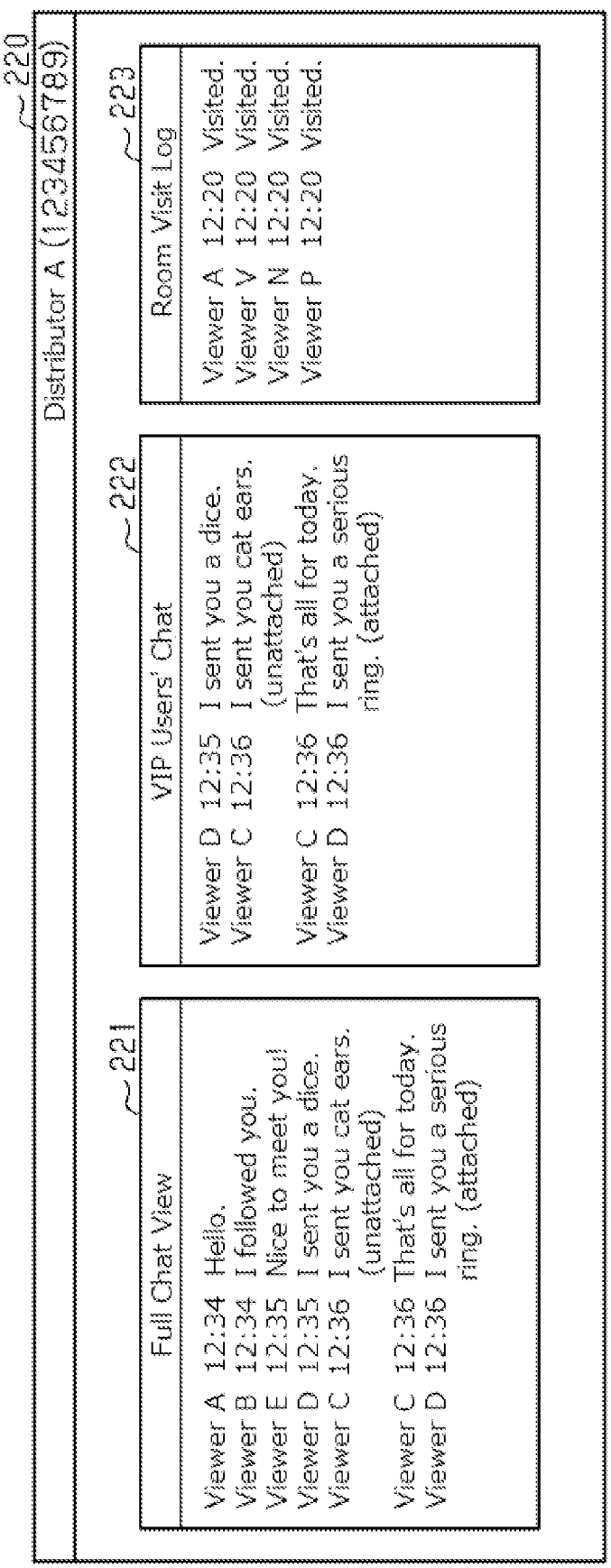
FIG. 15 illustrates an example of a view displayed on a display seen by an actor.

FIG. 15 shows an example of a message view 220 displayed on the sub display 43. The message view 20 may be displayed on the same sub display 43 as the gift list view 210, or it may be displayed on a different sub display 43 than the gift list view 210 when there are a plurality of sub displays 43. The message view 220 contains a first message display region 221, a second message display region 222, and a room visit log 223.

The first message display region 221 includes a list of post messages 23F associated with the content being distributed. These post messages are read out from the storage 23 by the computer processor 21 of the server 20. The post messages 23F are arranged in the order of the posting date and time. The post message having the latest posting date and time, or the newest post message may be displayed at the uppermost portion of the list. When a new post message is posted, this post message is added at the uppermost portion of the first message display region 221, and the post messages already displayed in the first message display region 221 are moved downward. It is also possible that the post messages are moved in the opposite direction. Specifically, the newest post message is added at the lowermost portion of the list, and the post messages already displayed in the first message display region 221 are moved upward. The list may contain, for each post message, identification information of the viewing user (such as the account name of the viewing user), a posting date and time, and a content of the message. The identification information of the viewing user may be an avatar of the viewing user.

The second message display region 222 includes a list of post messages from the viewing users who belong to the first group (VIP group). These post messages are extracted by the computer processor 21 of the server 20 from the post messages 23F stored on the storage 23. In the illustrated embodiment, the post messages displayed in the second message display region 222 are also displayed in the first message display region 221. Alternatively, it is also possible that the post messages displayed in the second message display region 222 are not displayed in the first message display region 221. The list displayed in the second message display region 222 may contain a ranking of the viewing user, in addition to identification information of the viewing user (such as the account name of the viewing user), a posting date and time, and a content of the message. The identification information of the viewing user may be an avatar of the viewing user.

The room visit log 223 is a list of the viewing users viewing the content being distributed. The computer processor 21 of the server 20 extracts the viewing users having the room visit status of "Visiting" with reference to the user management data 23C associated with the content being distributed. The room visit log 223 may contain identification information of the viewing user currently viewing the content, a room visit date and time, a room visit status, and a group. The identification information of the viewing user may be an avatar of the viewing user.

The actor can refer to the room visit log 223 to send a message such as "Hello, N" via the voice in the video to a viewing user who started viewing. In this way, since the actor can communicate with the viewing user who started viewing, the viewing user becomes fond of the character and is more satisfied with the content.

The actor can refer to the first message display region 221 and the second message display region 222 to deal with the post messages from the viewing users. Since the first message display region 221 is separated from the second message display region 222 for the viewing users of the first group, it is possible to readily grasp the tendency of the users who sent the post messages. For example, the actor can deal with the post messages from the viewing users of the first group by priority. This particularly increases the satisfaction of the viewing users of the first group with the content.

Alternatively, when the actor deals with the post messages from the viewing users of the second group by priority, it is possible to increase particularly the satisfaction of the viewing users of the second group with the content.

Figure 16:
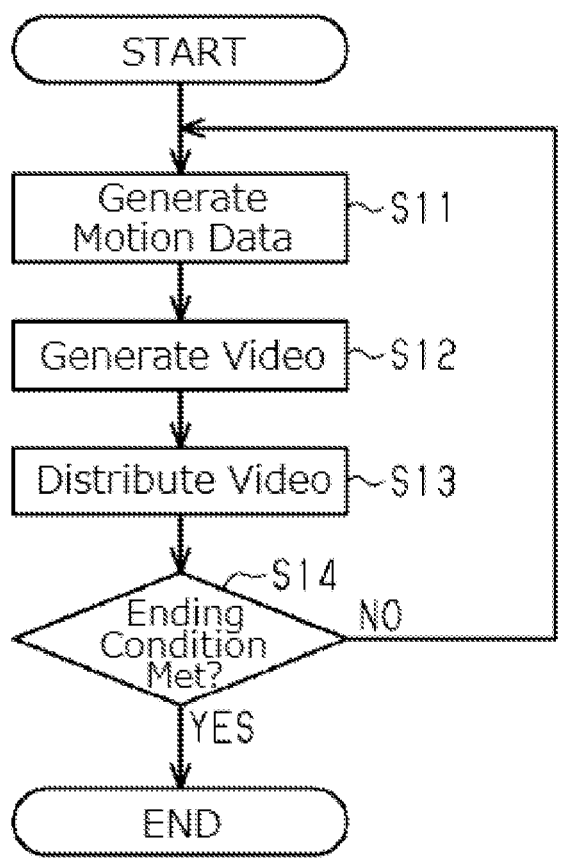
FIG. 16 is a flowchart of a video distribution process in one embodiment.

Next, a video distribution process in one embodiment will be described with reference to FIG. 16, In the video distribution process, it is assumed that the actor is giving a performance in the studio room R. In step S11, the motion data processing unit 21A of the server 20 generates the body motion data, which is a digital representation of the body motions of the actor, and the face motion data, which is a digital representation of the facial motions (expression) of the actor.

Subsequently, in step S12, the video generation unit 21B generates a video. The video generation unit 21B applies the body motion data and the face motion data of the actor to the model data 23A for the actor, thereby generating animation of the character object that moves in synchronization with the motions of the body and facial expression of the actor. The video generation unit 21B further generates a video using this animation. The voices of the actor are applied to the video.

Subsequently, in step S13, the video distribution unit 21C distributes the video generated in step S12 as a content. The content is distributed to the client devices 10 over the network 11. The content may be delivered to the supporter computer 45 and/or may be projected on the main display 41 in the studio room R. A content for one distribution has a predetermined length of time and is distributed continuously for this length of time. The length of time of the video may be set to, for example, 30 seconds, 1 minute, 5 minutes, 10 minutes, 30 minutes, 60 minutes, 120 minutes, and any other length of time.

Subsequently, in step S14, it is determined whether or not an ending condition for ending the distribution of the video is met. The ending condition is, for example, that the distribution ending time has been reached, that the supporter computer 45 has issued an instruction to end the distribution, or any other conditions. If it is determined that the ending condition is not met, steps S11 to S13 of the process are repeated, and the video including the animation synchronized with the motions of the actor is continuously distributed. If it is determined that the ending condition is met for the video, the distribution process of the video is ended.

Figure 17:
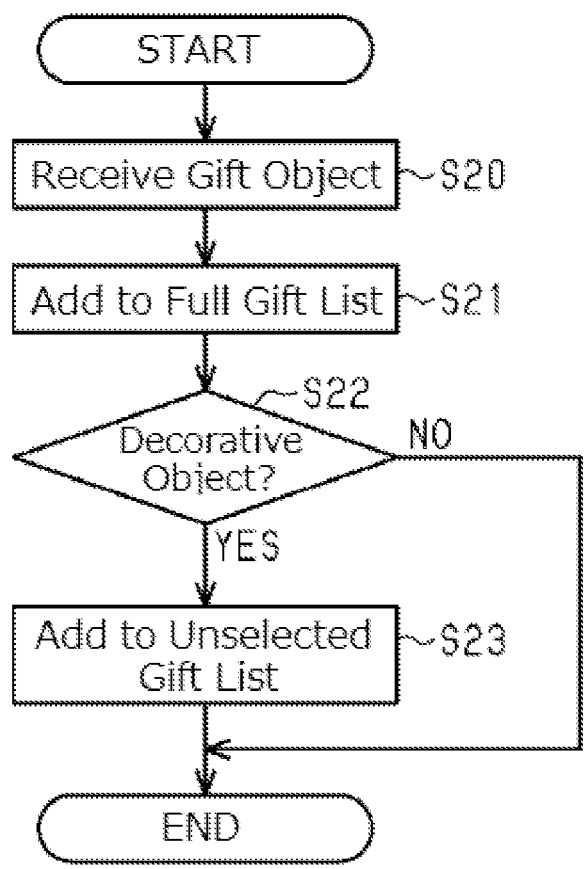
FIG. 17 is a flowchart of a process for receiving a decorative object in one embodiment.

Next, a reception process of a gift object will be described with reference to FIG. 17. When receiving a display request for a gift object sent from a client device 10, the user request processing unit 21D of the server 20 receives the gift object (step S20). The display request may include the identification information of the viewing user, the identification information of the gift object, the sending date and time, and so on.

The user request processing unit 21D adds the information on the received gift object to the candidate list 23E, and adds the information on this gift object to the gift list 211 of the gift list view 210 (step S21).

Subsequently, the user request processing unit 21D determines whether or not the added gift object is a decorative object (step S22). If the gift object is not a decorative object, that is, the gift object is an effect object or a normal object (No in step S22), the reception process of the gift object is ended.

If the gift object is a decorative object (Yes in step S22), the user request processing unit 21D adds the gift object to the unattached gift list 213 (step S23).

Figure 18:
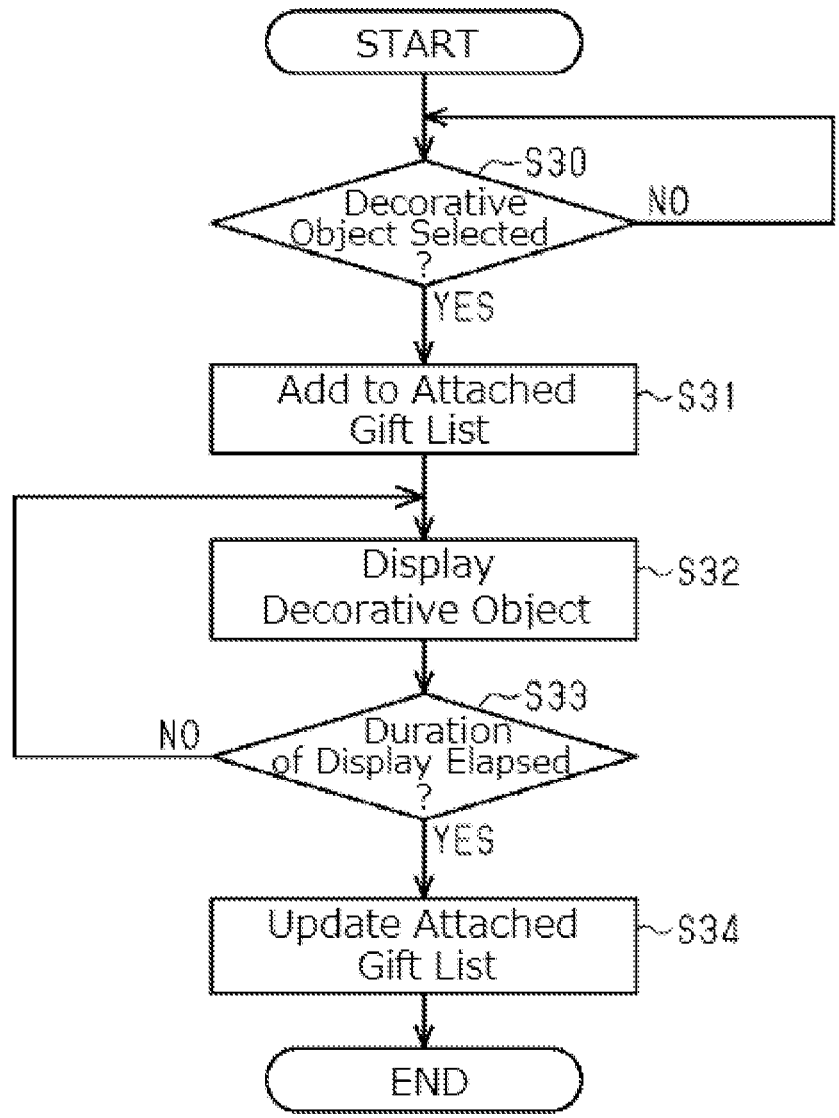
FIG. 18 is a flowchart of a process for displaying a decorative object in one embodiment.

Next, a selection process of a decorative object will be described with reference to FIG. 18. If it is determined that a decorative object is selected by operation of the actor or the supporter (Yes in step S30), the user request processing unit 21D erases the selected decorative object from the unattached gift list 213 and adds it to the attached gift list 212 (step S31). The video generation unit 21B displays the selected decorative object at a predetermined body part of the character object associated with the decorative object (step S32).

Further, it is determined whether or not the duration of display of the decorative object displayed in the video has elapsed (step S33). If the duration of display of the decorative object has not elapsed (No in step S33), the decorative object is displayed continuously. On the other hand, if the duration of display of the decorative object has elapsed (Yes in step S33), the attached gift list 212 is updated to change the status of the decorative object of which the duration of display has elapsed. Specifically, the decorative object of which the duration of display has elapsed is erased from the attached gift list 212, or it is grayed out or shown in some other way different than the decorative objects of which the duration of display has not elapsed.

Figure 19:
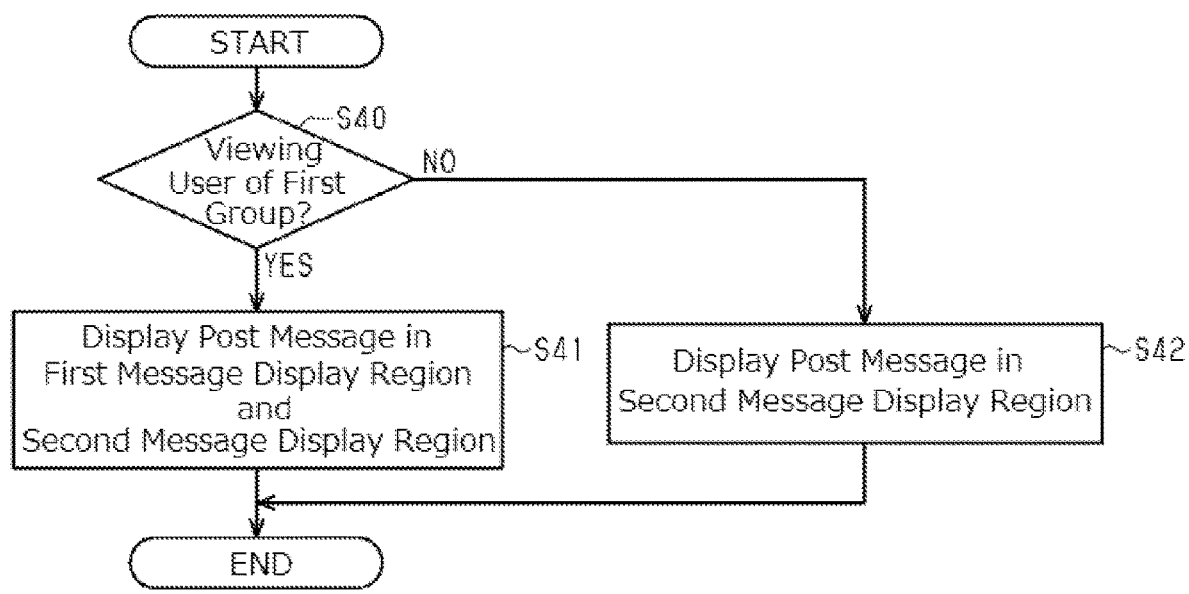
FIG. 19 is a flowchart of a process for displaying a post message in one embodiment.

Next, a description is given of a display process of a post message with reference to FIG. 19. When receiving identification information and a post message of a viewing user, the user request processing unit 21D determines whether or not the viewing user who sent the post message belongs to the first group (step S40). The user information management unit 21E groups the viewing users at a predetermined timing.

If it is determined that the viewing user who sent the received post message belongs to the first group (Yes in step S40), the user request processing unit 21D displays the post message in the first message display region 221 and the second message display region 222 (step S41). On the other hand, if it is determined that the viewing user who sent the received post message belongs to the second group (Yes in step S40), the user request processing unit 21D displays the post message in only the second message display region 222 (step S42).

As described above, the embodiment provides the following advantageous effects. (1) The video distribution system receives a display request for an object from a viewing user. A list of objects for which a display request has been received is displayed on the sub display 43 disposed at such a position as can be seen by the actor. The actor, who is giving a performance, can refer to the list displayed on the sub display 43 to quickly confirm the objects for which display is requested and the viewing users who requested display of these objects. Further, the actor, who quickly confirms the objects and the viewing users, can send messages to the viewing users who requested display at suitable timings. Accordingly, the actor can increase the chances for communication with the viewing users.

(2) Objects are selected from the gift list view 210 by the actor or any other users except the viewing users, and the selected objects are displayed in the video. Since the gift list view 210 includes objects for which display is requested, the actor or the like can select the objects efficiently. Therefore, the advantageous effects of the list can be enhanced.

(3) In the gift list view 210, selected objects and unselected objects are divided into separate lists. Therefore, for example, it is facilitated to select an object from the list of unselected objects. This supports the performance of the actor.

(4) Only the decorative objects are displayed in the attached gift list 212 and the unattached gift list 213. In other words, only the objects that need to be selected by a user other than the viewing users are displayed in the first list and the second list. Therefore, the actor can readily select a desired decorative object.

(5) The post messages from the viewing users of the first group are displayed in a different region than the post messages from the viewing users of the other group. Therefore, the actor can deal with the post messages from the viewing users of the first group by priority. Accordingly, the actor can increase the chances for communication with particular viewing users.

The foregoing embodiment can be modified as described below. The above embodiment and the following modifications can be implemented in combination to the extent where they are technically consistent with each other. In the above embodiment, the gift list view 210 contains the attached git list 212 and the unattached gift list 213 and is displayed on the sub display 43. Alternatively or additionally, at least one of a list of gifts from the viewing users of the first group and a list of gifts from the viewing users of the second group may be displayed on the sub display 43. Further, the list of gifts from the viewing users of the first group may be divided into an attached gift list and an unattached gift list. Likewise, the list of gifts from the viewing users of the second group may be divided into an attached gift list and an unattached gift list. In this way, the decorative gift objects can be displayed distinguishably in terms of the group of the viewing users in addition to whether the objects are attached or unattached. Therefore, it is possible to communicate with viewing users in accordance with the group thereof.

In the above embodiment, the gift list view 210 and the message view 220 are separate from each other. Alternatively, two or more of the attached gift list 212, the unattached gift list 213, the first message display region 221, the second message display region 222, and the room visit log 223 may be displayed adjacent to each other in one screen. It is also possible that the actor or the supporter can freely arrange in one screen any of the gift list 211, the attached gift list 212, the unattached gift list 213, the first message display region 221, the second message display region 222, and the room visit log 223.

In the above embodiment, one sub display 43 may display the gift list view 210 and the message view 220 alternately. These views may be switched upon reception of a display request for a gift object or a post message. For example, when a display request for a gift object is received, the gift list view 210 is displayed for a predetermined period, and when a post message is received, the message view 220 is displayed for a predetermined period.

In the above embodiment, the gift list view 210 and the message view 220 are displayed on the sub display 43. Alternatively, at least one of the gift list view 210 and the message view 220 may be displayed on the main display 41.

In the above embodiment, a decorative object disappears when a predetermined duration of display has elapsed after it is attached to a character object. Alternatively, a decorative object may disappear by operation of the actor or the supporter.

In the above embodiment, the gift list view 210 and the message view 220 are displayed on the sub display 43. Alternatively or additionally, these views may be displayed on a head-mounted display attached to the actor. The head-mounted display may be either transparent or nontransparent. The head-mounted display may display videos including animation of a character, or it may display, instead of such videos, only at least one of the gift list view 210 and the message view 220.

In the above embodiment, the viewing users are divided into a plurality of groups in accordance with the number of times of viewing the content, the number of times of posting a post message to the content, the number of times of sending a gift object to the content, and the amount of money paid to the content. Alternatively, the viewing users may be divided into the following two groups: the group of viewing users who behave improperly to the distributed video (e.g., a second group), and the group of the other viewing users (e.g., a first group). Since information that identifies a viewing user, such as the real name or the address of the viewing user, is not disclosed to the distributor or other viewing users, except for necessary information such as the account name, the user ID, or the avatar, a malicious viewing user may behave improperly in activities such as posting a message to the video and requesting display of a gift object. To prevent a trouble, the distributor needs to quickly perceive such viewing users "visiting the room" (logging in), posting a message, and so on. The condition for assignment to groups is, for example, that a viewing user has previously sent an improper message to the video or the number of times of his/her doing so has reached a threshold value. The way to determine that a message is improper is, for example, that the server 20 analyzes the content of the message and determines that the message is improper when it determines that a word contained in the message is improper. Another way is that the distributor or the administrator visually check the messages posted to the video to determine whether or not the message is improper, and still another way is to determine that a message is improper when any other viewing user reports it. When the distributor or the administrator determines whether or not a message is improper, the distributor or the administrator operates the supporter computer 45 or the like to assign the viewing user who sent the message to, for example, "a second group." Alternatively, the distributor or the administrator operates the supporter computer 45 or the like to update the number of times that the viewing user who sent the message made an improper remark. The server 20 receives such information from the supporter computer 45 or the like to update the user management data. Such grouping may be managed for each content as in the above embodiment, or it may be managed generally for the entire platform for distributing the video. The room visit log 223 may include the group to which a viewing user belongs, in addition to the identification information of the viewing user. When a viewing user who belongs to the second group and needs to be monitored "visits the room", the identification information of this viewing user is displayed in the room visit log 223 (FIG. 15), and therefore, the distributor can force the viewing user to leave the room. Alternatively, when the viewing user "visits the room," the server 20 may automatically force the viewing user to leave the room. Instead of forcing the viewing user to leave the room, the distributor may pay attention to prevent the viewing user who needs to be monitored from bothering other viewing users after the room visit log 223 indicates that the viewing user who needs to be monitored visited the room.

In one embodiment, a plurality of infrared LEDs are mounted on each of the wearable sensors 33 attached to the actor, and light from the infrared LEDs are sensed by infrared cameras provided on the floor and/or wall of the studio room R to detect the position and the orientation of each of the wearable sensors 33. Visible light LEDs may be used instead of the infrared LEDs, and in this case light from the visible light LEDs may be sensed by visible light cameras to detect the position and the orientation of each of the wearable sensors 33. As described above, a light emitting unit (for example, the infrared LED or visible light LED) may be provided on each of the plurality of wearable sensors 33 attached to the actor, and a light receiving unit (for example, the infrared camera or visible light camera) provided in the studio room senses the light from the light emitting unit to detect the position and the orientation of each of the wearable sensors 33. In one embodiment, a plurality of markers may be used instead of the wearable sensors 33. The markers are provided on each actor. Alternatively, the markers may be provided on the costume of the actor (e.g., an upper garment, a lower garment, or a suit including these garments combined). At least one of the position and the orientation of each marker can be detected by capturing images of the actor having the markers attached thereto to generate captured image data and performing image processing on the captured image data. It is also possible that the wearable sensor 33, sensors that can sense at least one of position and orientation such as acceleration sensors or gyroscopes, electrostatic sensors, or any other sensors that can send signals to and receive signals from external sensors 32 and/or the server 20 are provided on the costume of the actor (e.g., an upper garment, a lower garment, or a suit including these garments combined), and at least one of the position, the orientation, and the motion of each of the sensors based on the signals sent from these sensors. Further, the tracking system 31 may be capable of detect the motions of the actor with only external sensors 32 and without using the wearable sensors 33.

The method according to the embodiment may be implemented by a program that can be executed by a computer. The program may be stored on, for example, a magnetic disc (such as Floppy™ disk and hard disk), an optical disc (such as CD-ROM, DVD, and MO), a semiconductor memory (such as ROM, RAM, and flash memory), or any other storage medium or non-transitory computer-readable storage medium. The program may also be transmitted by a communication medium for distribution. The program stored on the storage medium may include a setting program for constructing a software means (including not only an execution program, but also tables and data structures) to be executed by the computer. The computer that realizes this device reads the program stored on the storage medium and, if necessary, constructs the software means by the setting program, and the software means controls the operation to perform the process described above. The term "storage medium" used herein includes not only those for distribution, but also storage media such as a magnetic disc and a semiconductor memory installed in the computer or connected over a network.

The computer processors 12, 21, and 46 do not necessarily perform software processing for all the processes they perform. For example, the computer processors 12, 21, and 46 may include a dedicated hardware circuit (e.g., application-specific integrated circuits (ASIC)) for hardware processing for at least a part of the processes they perform. Specifically, the computer processors 12, 21, and 46 may be formed as a circuitry including: 1) one or more processors that operate in accordance with a computer program (software); 2) one or more dedicated hardware circuits that perform at least a part of the various processes; or 3) a combination thereof. The processors include CPU and a memory such as RAM and ROM, and the memory stores program codes or instructions configured to cause the CPU to perform processes. The memory, or a computer-readable medium, encompasses any kind of available media accessible via a general-purpose or dedicated computer.

What is claimed is:

1. A video distribution system for causing a plurality of client devices to display a video including animation of a character object generated based on a motion of an actor, each of the plurality of client devices being used by associated one of a plurality of viewing users, the plurality of viewing users including a first viewing user, the video distribution system comprising:
   one or more computer processors; and
   a display device seeable by a selecting user, the selecting user being at least one of the actor or a supporter and different from the first viewing user,
   wherein the one or more computer processors execute computer-readable instructions to:
      receive from the first viewing user a first display request for requesting display of a first object among one or more objects; and
      display object information on the display device, the object information including information on the first object, identification information of the first viewing user who made the first display request, and a selection status indicating whether or not the first object has been selected by the selecting user, the information on the first object, the identification information and the selection status displayed in association with one another,
   wherein the one or more objects include one or more decorative objects and one or more other objects,
   wherein the one or more computer processors execute computer-readable instructions to receive from one of the plurality of viewing users a third display request for requesting display of an other object of the one or more other objects, and
   wherein the object information displayed on the display device further includes other-object information including information on the other object and identification information of the one of the plurality of viewing users who made the third display request, the information on the other object and the identification information of the one of the plurality of viewing users displayed in association with one another, the other-object information not including a selection status indicating whether or not the other object has been selected by the selecting user.

2. The video distribution system of claim 1, wherein when at least some part of the object information is selected by the selecting user, and selection of the first object is received, the first object is displayed in the video.

3. The video distribution system of claim 2,
   wherein the one or more computer processors receive from the first viewing user a second display request for requesting display of a second object among the one or more objects that is different from the first object and different from the other object, and
   wherein the object information includes a first list and a second list, the first list including first object information on the first object selected by the selecting user, the second list including second object information on the second object not selected by the selecting user.

4. The video distribution system of claim 1,
   wherein each of the one or more decorative objects is displayed in the video when selected by the selecting user, and
   wherein the other object is displayed in the video in response to reception of the third display request for requesting display of the other object.

5. The video distribution system of claim 3, wherein the one or more decorative objects include the first object and the second object and wherein the first list and the second list include information on the one or more decorative objects only.

6. The video distribution system of claim 1, wherein when behavior of the first viewing user on the video satisfies a predetermined condition, the one or more computer processors associate the first viewing user with one of a plurality of groups.

7. The video distribution system of claim 1,
wherein each of the plurality of viewing users is associated with one of a plurality of groups, and
wherein the one or more computer processors are configured to:
receive one or more post messages sent from one or more of the plurality of viewing users to the video being distributed; and
display first and second message display regions on the display device, the first message display region being configured to display one or more post messages sent from one or more of the plurality of viewing users who belong to a predetermined group among the plurality of groups, the second message display region being configured to display one or more post messages sent from one or more of the plurality of viewing users who do not belong to the predetermined group.

8. The video distribution system of claim 1,
wherein the first object is included in the one or more decorative objects.

9. A video distribution method performed by one or more computer processors executing computer-readable instructions to cause a plurality of client devices to display a video including animation of a character object generated based on a motion of an actor, each of the plurality of client devices being used by associated one of a plurality of viewing users, the plurality of viewing users including a first viewing user, the video distribution method comprising the steps of:
receiving from the first viewing user a first display request for requesting display of a first object among one or more objects; and
displaying object information on a display device positioned to be seeable by a selecting user, the selecting user being at least one of the actor or a supporter and different from the first viewing user, the object information including information on the first object, identification information of the first viewing user who made the first display request, and a selection status indicating whether or not the first object has been selected by the selecting user, the information on the first object, the identification information and the selection status displayed in association with one another,
wherein the one or more objects include one or more decorative objects and one or more other objects,
wherein the one or more computer processors execute computer-readable instructions to receive from one of the plurality of viewing users a third display request for requesting display of an other object of the one or more other objects, and
wherein the object information displayed on the display device further includes other-object information including information on the other object and identification information of the one of the plurality of viewing users who made the third display request, the information on the other object and the identification information of the one of the plurality of viewing users displayed in association with one another, the other-object information not including a selection status indicating whether or not the other object has been selected by the selecting user.

10. A non-transitory computer-readable storage medium storing a video distribution program for causing a plurality of client devices to display a video including animation of a character object generated based on a motion of an actor, each of the plurality of client devices being used by associated one of a plurality of viewing users, the plurality of viewing users including a first viewing user, the video distribution program causing one or more computer processors to:
receive from the first viewing user a first display request for requesting display of a first object among one or more objects; and
display object information on a display device positioned to be seeable by a selecting user, the selecting user being at least one of the actor or a supporter and different from the first viewing user, the object information including information on the first object, identification information of the first viewing user who made the first display request, and a selection status indicating whether or not the first object has been selected by the selecting user, the information on the first object, the identification information and the selection status displayed in association with one another,
wherein the one or more objects include one or more decorative objects and one or more other objects,
wherein the video distribution program causes the one or more computer processors to receive from one of the plurality of viewing users a third display request for requesting display of an other object of the one or more other objects, and
wherein the object information displayed on the display device further includes other-object information including information on the other object and identification information of the one of the plurality of viewing users who made the third display request, the information on the other object and the identification information of the one of the plurality of viewing users displayed in association with one another, the other-object information not including a selection status indicating whether or not the other object has been selected by the selecting user.

* * * * *